United States Patent
Eismann et al.

(10) Patent No.: US 6,170,623 B1
(45) Date of Patent: *Jan. 9, 2001

(54) METHOD OF AND APPARATUS FOR ACTUATING AN ADJUSTABLE TORQUE TRANSMITTING SYSTEM IN THE POWER TRAIN OF A MOTOR VEHICLE

(75) Inventors: Wolfgang Eismann, Stuttgart; Michael Salecker, Bühl, both of (DE); Gunter Jürgens, Pörtschach (AT)

(73) Assignee: LuK Getriebe-Systeme GmbH, Buhl/Baden (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/769,499

(22) Filed: Dec. 18, 1996

(30) Foreign Application Priority Data

Dec. 18, 1995 (DE) ............................. 195 47 082

(51) Int. Cl.[7] ................................. B60K 23/00
(52) U.S. Cl. .............. 192/3.55; 192/3.56; 192/3.58; 192/3.62
(58) Field of Search ................. 192/3.55, 3.56, 192/3.58, 3.61, 3.62, 3.63; 74/335; 477/77, 79, 86

(56) References Cited

U.S. PATENT DOCUMENTS

| | | | |
|---|---|---|---|
| 3,910,388 | * 10/1975 | Moori et al. | 192/3.56 |
| 4,158,404 | * 6/1979 | Yamashita et al. | 192/3.58 |
| 4,267,907 | * 5/1981 | Hiraiwa | 192/3.56 |
| 4,344,514 | * 8/1982 | Fujihara et al. | 192/3.58 |
| 4,723,642 | 2/1988 | Grunberg et al. . | |
| 5,029,683 | 7/1991 | Grunberg et al. | 192/3.56 |
| 5,038,901 | * 8/1991 | Parsons et al. | 192/3.55 |

FOREIGN PATENT DOCUMENTS

OS 4013299
A1    11/1990  (DE).

* cited by examiner

Primary Examiner—Charles A Marmor
Assistant Examiner—Saúl Rodríguez
(74) Attorney, Agent, or Firm—Darby & Darby

(57) ABSTRACT

A clutch between the combustion engine and the manual multiple-gear-ratio transmission in the power train of a motor vehicle is disengaged or otherwise adjusted in response to a signal from a control unit which processes signals transmitted by sensors serving to monitor the positions and/or the extent of movements of one or more mobile components of the manual transmission. A signal to disengage or to otherwise adjust the clutch is generated when the monitored position(s) of and/or the magnitude(s) of force(s) acting upon one or more mobile components indicate that the operator of the motor vehicle intends to shift the transmission into or from a selected gear ratio.

13 Claims, 5 Drawing Sheets

METHOD OF AND APPARATUS FOR ACTUATING AN ADJUSTABLE TORQUE TRANSMITTING SYSTEM IN THE POWER TRAIN OF A MOTOR VEHICLE

BACKGROUND OF THE INVENTION

The invention relates to improvements in methods of and in apparatus for adjusting or actuating torque transmitting systems, particularly for adjusting clutches in the power trains of motor vehicles. Still more particularly, the invention relates to improvements in methods and apparatus which can be resorted to with advantage for adjusting the transmission of torque from a prime mover (such as the internal combustion engine of a motor vehicle) to a transmission (e.g., a manual transmission having a plurality of gear ratios). The transmission of torque can be effected by a clutch (e.g., a friction clutch) which can be installed upstream or downstream of the transmission.

Certain presently known apparatus for actuating adjustable clutches or analogous torque transmitting systems are disclosed, for example, in published German patent application No. 40 13 299 and in U.S. Pat. Nos. 4,723,642 and 5,029,683.

The published German patent application No. 40 13 299 discloses a transmission wherein an elastic element is built into a lever which is to be actuated by hand to select the gear ratio of the transmission. An analog sensor is provided to detect the extent of deformation or displacement of such elastic element during manual shifting of the lever for the purpose of changing the gear ratio of the transmission. The U.S. Pat. Nos. 4,723,642 and 5,029,683 disclose manual transmissions with levers having built-in switches which are actuated in response to manipulation of the lever for the purpose of selecting a different gear ratio.

OBJECTS OF THE INVENTION

An object of the invention is to provide a simple, compact and reliable apparatus for actuating a clutch or another adjustable torque transmitting system, particularly in the power train between a prime mover and a multiple gear ratio transmission in a motor vehicle.

Another object of the invention is to provide an apparatus which need not employ a substantial number of complex and expensive sensors or other devices for monitoring the movements and/or other variable parameters of component parts of a manual transmission in the power train of a motor vehicle.

A further object of the invention is to provide the above outlined apparatus with novel and improved means for ascertaining the presence or the absence of an intent on the part of the operator of a motor vehicle to shift a manual transmission into a different gear ratio.

An additional object of the invention is to provide an apparatus which automatically ensures convenient shifting of the transmission into a different gear ratio as soon as the operator provides a detectable indication that she or he intends to effect such shifting.

Still another object of the invention is to provide an apparatus whose operation is not affected, or is not unduly affected, by evental changes in the condition of one or more component parts of the power train during the useful life of a motor vehicle.

A further object of the invention is to provide an apparatus whose operation remains at least substantially unchanged during the entire life span of the power train in a motor vehicle.

Another object of the invention is to provide a novel and improved manual transmission for use in conjunction with the above outlined apparatus.

An additional object of the invention is to provide an apparatus which invariably ensures timely disengagement of the clutch in the power train of a motor vehicle when the operator of the vehicle proceeds to change the speed ratio of a manual transmission in such power train.

Still another object of the invention is to provide a novel and improved combination of a clutch, a manual transmission, various sensors and a central control unit for use in the above outlined apparatus.

A further object of the invention is to provide an apparatus which can reliably ascertain an operator's intent to change the ratio of any one of a number of different manual transmissions which are utilized in the power trains of motor vehicles to receive torque from a combustion engine or another suitable prime mover by a way of a friction clutch or another torque transmitting system.

Another object of the invention is to provide a novel and improved method of adjusting a torque transmitting system in response to detection of the intention by an operator of a motor vehicle to change the ratio of a manual transmission.

An additional object of the invention is to provide a novel and improved method of ascertaining the intent of the operator of a motor vehicle to change the ratio of a manual transmission.

Still another object of the invention is to provide a method which is not affected by eventual wear and/or other undesirable changes of the condition or characteristics of the component parts of the above outlined apparatus.

A further object of the invention is to provide a novel and improved method of ensuring timely changes in the condition of a clutch or another suitable torque transmitting system in the power train of a motor vehicle when the operator of the vehicle furnishes a detectable indication that she or he intends to actuate the manual transmission in the power train.

Another object of the invention is to provide a method which can be practiced by resorting to a simple, compact and relatively inexpensive apparatus and which can detect the intent of the operator of the vehicle to change the ratio of a manual transmission as soon as such intent becomes detectable in any one of a number of different ways.

An additional object of the invention is to provide a power train which embodies or which can be combined with the above outlined apparatus.

Still another object of the invention is to provide a motor vehicle which embodies the above outlined apparatus.

SUMMARY OF THE INVENTION

One feature of the instant invention resides in the provision of an apparatus for actuating an adjustable system (such as an engageable and disengageable clutch, e.g., a friction clutch) for transmitting torque in a power train including a tranmission (e.g., a manual transmission) having a plurality of gear ratios (e.g., forward gear ratios one to five or one to six, a reverse gear ratio and a neutral gear ratio), at least one external ratio selecting member (e.g., a pivotable lever having a knob which can be engaged by a hand of the operator of a motor vehicle in which the power train is being put to use), at least one internal gear shifting member (e.g., a shaft in the case of the transmission) and a connection between the external and internal members. The improved apparatus comprises monitoring means including at least one sensor (e.g., a potentiometer or a Hall generator) for transmitting first signals which denote changes of at least one variable parameter of at least one component of a plurality of components including the at least one external member, at least one internal member and at least one element of the connection forming part of the transmission), a control unit (e.g., a computerized central control unit) having means for processing the first signals and for generating second signals as a function of the first signals, and means (e.g., an electric motor) for adjusting the torque transmitting system in response to the second signals.

The power train can be installed in a motor vehicle and can further include a prime mover (such as an internal combustion engine). The connection between the external and internal members of the transmission can include a resilient element (e.g., a coil spring), and the aforementioned components can include a second element forming part of the connection and being connected with the at least one external member, and a third element also forming part of the connection and secured to the at least one internal member. The at least one sensor can be operative in a power flow between the resilient element and one of the external and internal members.

At least one of the second and third elements of the connection can include or constitute a mobile element, and the at least one sensor can be mounted and designed to monitor the extent of movement of such mobile element.

The at least one external member can be mounted for movement between a plurality of positions each of which is indicative of a different force which is required to move the at least one external member to the respective position.

Otherwise stated, the at least one external member is movable through a plurality of different distances each of which is indicative of a different force which is required to move the at least one external member through the respective distance.

For example, the arrangement can be such that the at least one external member is movable from a first position to a plurality of additional positions through different distances each of which is indicative of a different force required to move the at least one external member to the respective additional position. One of these distances can be indicative of a threshold value of such force.

As mentioned above, the connection between the at least one external member and the at least one internal member of the transmission can comprise a resilient element, and the at least one external member can be arranged for movement between a plurality of different positions each of which is indicative of a different force required to move the at least one external member to the respective position. The first signals can denote the positions of the at least one external member, and the second signals can denote the intended movement of the at least one external member to select a gear ratio when the first signals denote that the position of the at least one external member, as detected by the at least one sensor, matches a predetermined threshold position or departs from such predetermined threshold position.

The processing means can include means for comparing the second signals with a third signal denoting a threshold of a force which is to be applied to the at least one external member to select a given transmission ratio, and means for generating second signals denoting the intended movement when the first signals denote that the position of the at least one external member (a) matches or (b) is other than the predetermined threshold position. The transmission can be constructed and assembled to maintain the at least one member in a selected position with a preselected retaining force; the second signals which denote the intended movement of the at least one external member are generated when the respective first signals denote that the force which is required to move the at least one external member to the sensor-detected position at least matches the preselected force. The ratio of the magnitude of the force which is required to move the at least one external member relative to the magnitude of the retaining force is or can be between about 0.5 and 0.95, preferably between about 0.6 and 0.9.

As mentioned above, the connection between the internal and external members of the transmission can comprise a resilient element (such as a coil spring or a synthetic plastic resilient element), and the at least one external member of the transmission can be installed for movement through a plurality of different distances each of which is indicative of a different force required to move the at least one external member through the respective distance. The first signals can denote the distances which are covered by the at least one external member, and the second signals can denote the intended movement of the at least one external member to select a gear ratio when the first signals denote that the distance which has been covered by the at least one external member and which has been detected by the at least one sensor either matches or is other than a predetermined threshold distance. In such apparatus, the processing means can include means for comparing the second signals with a third signal which denotes a threshold of a force to be applied to the at least one external member in order to select a given transmission ratio, and for generating second signals which denote the intended movement when the first signals indicate that the distance which has been covered by the the at least one external member either matches or is other than the predetermined threshold distance. Here, again, the transmission can be constructed and assembled to maintain the at least one external member in a selected position with a preselected retaining force, and the second signals which denote the intended movement of the at least one external member are generated when the force which is required to move the at least one external member through the sensor-detected distance at least matches the preselected retaining force. In this embodiment, too, the magnitude of the force which is required to move the at least one external member relative to the magnitude of the preselected retaining force can be between about 0.5 and 0.95, preferably between about 0.6 and 0.9.

If the at least one external member is movable through a plurality of different distances and the first signals denote such distances, the signal generating means of the control unit can be designed to generate a second signal which denotes a threshold distance when the respective first signal indicates a movement of the at least one external member through a predetermined distance.

The arrangement is normally such that the at least one external member is movable through a plurality of different distances in response to the application or exertion of different forces; the signal generating means of the control unit can be designed to generate a second signal denoting a force having a threshold value when the respective first signal or signals denote a movement of the at least one external member through a predetermined distance.

The signal generating means of the control unit can be set up to generate a second signal indicating an intent to shift the transmission into a selected gear ratio by way of the at least one external member in response to the processing of a predetermined first signal, e.g., a signal having a predetermined intensity or another characteristic. Such predetermined first signal can be a threshold signal. A second signal denoting an intent to shift into a selected gear ratio can be generated in response to the generation (by the signal processing means of the control unit) of a signal having a characteristic which is the difference between the characteristics of a plurality of first signals. Alternatively, the signal which induces the signal generating means of the control unit to transmit a second signal can be a quotient of differences between the characteristics of a plurality of first signals.

The monitoring means can include a plurality of sensors each having an output operatively connected with the control unit to transmit signals denoting a variable parameter of a discrete component of the aforementioned plurality of components; the signal generating means of the control unit in such apparatus can be designed to generate a second signal denoting an intent to shift the transmission into a selected gear ratio by way of the at least one external member in response to the processing of a given signal from one of the sensors. Such given signal can constitute a threshold signal. The second signal which denotes an intent to shift the transmission into a different gear ratio can be generated in response to the generation by the signal processing means of the control unit of a signal having a characteristic which is a difference between the characteristics of signals from the one sensor. Furthermore, the second signal which denotes the intent to shift the transmission into a selected gear ratio can be generated in response to the generation, by the signal processing means of the control unit, of a signal which is a quotient of differences between the characteristics of a plurality of signals from the one sensor.

The signal generating means of the control unit can be designed to transmit to the adjusting means a second signal having a different threshold value for each of the plurality of gear ratios of the transmission in the power train.

Alternatively, the gear ratios of the transmission can be comprised of at least two groups, and the signal generating means of the control unit can be designed to transmit to the adjusting means a second signal having a different threshold value for each such group of gear ratios.

Still further, the signal generating means of the control unit can be designed to transmit to the adjusting means a second signal having a selected (given) threshold value for each of the plurality of gear ratios of the transmission.

If the power train is installed in a motor vehicle and the first signals include at least one signal denoting a threshold value, the processing means of the control unit can be designed to subject the at least one signal to at least one of a plurality of treatments including testing, evaluating, fixing and adapting as a function of at least one of: (a) time, (b) the condition of the motor vehicle (e.g., whether the engine of the vehicle is on or off), and (c) a least one specific event (e.g., a specific position of the throttle valve, the position of the gas pedal, etc.). The gear ratios of the transmission normally include a neutral gear and a plurality of additional gear ratios; the aforementioned treatment of the at least one signal can involve adapting the at least one signal during shifting of the transmission into the neutral gear or into one of the plurality of additional gear ratios. Alternatively, the at least one signal can be adapted while the transmission is already shifted into the neutral gear or into one of the additional gear ratios.

The power train can further comprise a prime mover (e.g., an internal combustion engine) having an idle condition and an operative condition, and the torque transmitting system in such power train can comprise an engageable and disengageable clutch. The second signals can denote an intent on the part of the operator of the motor vehicle to shift the transmission into a selected gear ratio, and the aforementioned treatment by the processing means of the control unit can include adapting the at least one signal to generate a second signal denoting the aforementioned intent while the clutch is disengaged and in response to the satisfaction or fulfillment of at least one of a plurality of prerequisites or specific events including (a) a relatively slow shifting of the transmission into a selected gear ratio, (b) a relatively rapid shifting of the transmission into a selected gear ratio, (c) shifting of the transmission into a selected gear ratio in the idle condition of the prime mover, (d) shifting of the transmission into a selected gear ratio in the operative condition of the prime mover, (e) shifting of the transmission out of a previously selected gear ratio, and (f) shifting of the transmission into a selected gear ratio irrespective of the condition of the prime mover.

If the power train is put to use in a motor vehicle and further includes a prime mover, and if the second signals are indicative of an intent on the part of the operator of the motor vehicle to shift the transmission into a selected gear ratio, the processing means of the control unit can include means for converting (a) the one signal, (b) the first signals, and/or (c) the treated signals into a second signal which causes the adjusting means to disengage, or to maintain in disengaged condition, a clutch (such as a friction clutch) of the torque transmitting system.

When the shifting of the transmission into a selected gear ratio is completed, the first signals can denote the position and/or the dynamics of the at least one external member.

If the power train forms part of a motor vehicle and the transmission further comprises means for holding at least one of the aforementioned plurality of components with a predetermined retaining force upon completion of the shifting of the transmission into a selected gear ratio, the at least one external member can be set up to complete or cover a movement from a first position to a second position in response to the application of a second force corresponding to the retaining force during shifting of the transmission into a first selected gear ratio, and such at least one external member is preferably movable to at least one third position. The first signals can be indicative of the position of the at least one external member, and the second signals can be indicative of an intent on the part of the operator of the motor vehicle to shift the transmission from the first selected gear ratio into a second selected gear ratio when the first signals indicate that the at least one external member has assumed one of the second and third positions.

Alternatively, the second signals can be indicative of an intent on the part of the operator of the motor vehicle to shift the transmission from the first selected gear ratio into a second selected gear ratio when the first signals indicate that the at least one external member has covered a distance at least matching the first distance.

If the transmission further comprises means for engaging at least one of the plurality of components (e.g., the at least one external member) with a predetermined retaining force upon completion of shifting of the transmission into a selected gear ratio, and if the second signals serve to indicate an intent on the part of the operator of the motor vehicle to shift the transmission from one selected gear ratio into another selected gear ratio, the at least one external member can be mounted for movement by the operator in response to the application of a second force which at least matches the retaining force. In such apparatus, the first signals can indicate the extent of movement of the at least one external member in response to the application of the second force. The processing means of the control unit in such apparatus is or can be designed to generate second signals denoting the intent on the part of the operator in response to the generation of a first signal denoting a predetermined extent of movement of the at least one external member.

Another feature of the invention resides in the provision of an apparatus for actuating an adjustable system for transmitting torque in a power train between a prime mover and a transmission of the type having a plurality of gear ratios an including a mobile external gear ratio selecting member, device or component, a mobile internal gear shifting device, member or component, and a connection between the external and internal devices. The apparatus comprises at least one first sensor having means for transmitting first signals denoting changes of the position of the external device, at least one second sensor having means for transmitting second signals denoting the position of the internal device, a control unit having means for processing the first and second signals and for generating third signals as a function of the first and second signals, and means for adjusting the torque transmitting system in response to the third signals. The torque transmitting system is or can be adjustable between an engaged condition and a disengaged condition, and it can comprise a clutch, e.g., a friction clutch. The external device can include a gear ratio selecting lever and at least one first element connected with the lever (such element can form part of the aforementioned connection), and the internal device can include a shaft and at least one second element connected with the shaft (again, such second element can form part of the connection).

A further feature of the invention resides in the provision of an apparatus for actuating an adjustable system which transmits variable torque in a power train between a prime mover and a transmission having a plurality of gear ratios and including an external device which is movable by an operator in dependency upon the magnitude of the torque being transmitted by the torque transmitting system to select the ratios of the transmission, an internal gear shifting device and a connection between the external and internal devices. The apparatus comprises at least one first sensor having means for transmitting first signals denoting changes of the position of the external device, at least one second sensor having means for transmitting second signals denoting the position of at least one of the external and internal devices, a control unit having means for evaluating the first and/or the second signals and for generating, as a function of the evaluated signals, third signals which indicate the intended movement of the external device by the operator, and means for adjusting the torque transmitting system in response to the third signals to permit or enable the torque transmitting system to transmit a torque which ensures that the operator can move the external device for the purpose of selecting a desired gear ratio. The torque transmitting system can include a clutch, e.g., a friction clutch. The external device can include a gear selecting lever, and the connection can include at least one element which is connected with the lever. The internal device can include a shaft, and the connection can further comprise at least one second element which is connected with the shaft.

An additional feature of the invention resides in the provision of an apparatus for actuating an engageable and disengageable system for transmitting variable torque in a power train between a prime mover and a transmission having a plurality of gear ratios and including an external device which is movable by an operator in dependency upon the magnitude of the torque being transmitted by the torque transmitting system to select the gear ratios of the transmission, a mobile internal gear shifting device, and a connection between the external and internal devices. The apparatus comprises at least one first sensor having means for transmitting first signals which indicate changes of the position of the external device, at least one second sensor having means for transmitting second signals which indicate the position of at least one of the external and internal devices, and a control unit having means for evaluating the first signals and/or the second signals and for generating, as a function of the evaluated signals, third signals which indicate the intended movement of the external device by the operator in response to the satisfaction or fulfillment of at least one of a plurality of conditions or prerequisites including (a) detection of movement of the external device through a predetermined distance to a threshold of an extent of movement which is necessary to change the ratio of the transmission, (b) detection of movement of the external device to or beyond a predetermined position, (c) detection of a difference between the characteristics of the first and second signals exceeding a predetermined threshold value, and (d) detection that a quotient of the differences between the characteristics of the first and second signals reaches, exceeds or is below a predetermined threshold value. Such apparatus further comprises means (such as a linkage, a fluid-operated unit or an electric motor) for disengaging the torque transmitting system in response to the third signals. The torque transmitting system can include a clutch, e.g., a friction clutch. The external device can include a gear ratio selecting or gear shift lever, and the connecting means can include at least one first element (e.g., a link) which is connected with the lever; the internal device can include a shaft and the connection can further include at least one second element which is connected with the shaft.

Still another feature of the invention resides in the provision of an apparatus for actuating an adjustable system for transmitting variable torque in a power train between a prime mover (such as a combustion engine) and a transmission of the type having a plurality of gear ratios and including an external device which is movable to select the gear ratios of the transmission, a mobile internal gear shifting device, and a connection between the external and internal devices. The apparatus comprises at least one sensor having means for transmitting first signals which are indicative of changes of the position of the external device, and a control unit having means for evaluating the first signals and for generating, as a function of the evaluated signals, second signals which indicate the intended movement of the external device by an operator of the external device in response to detection of a movement of the external device through a predetermined distance beyond thresholds of predetermined adapted extents of movement of the external device.

An additional feature of the invention resides in a combination of sensors which can be embodied in an apparatus for actuating an adjustable system for transmitting torque in a power train encompassing a prime mover and a transmission having a plurality of gear ratios and including a mobile external gear ratio selecting device and at least one first element connected with such external device, a mobile internal gear shifting device, and at least one second element connected with the internal device. At least one of the first and second elements is movable between a plurality of positions, and the transmission further includes a connection provided between the external and internal devices and including resilient means between the at least one first element and the at least one second element. The novel combination comprises at least one first sensor (e.g., a potentiometer or a Hall generator) having means for transmitting first signals denoting the position of the movable element, and at least one second sensor including means for transmitting signals denoting the positions of the at least one first element and/or the at least one second element. The external device can comprise a gear selector lever which is connected with the at least one first element.

A further feature of the invention resides in the provision of an apparatus for actuating an engageable and disengageable system for transmitting torque in a power train including a transmission having a plurality of gear ratios and comprising a plurality of mobile components including at least one external gear ratio selecting member, at least one internal gear shifting member, a first element connected with the at least one external member and a second element connected with the at least one internal member. The apparatus comprises at least one first sensor having means for generating first signals which indicate the positions of at least one of the at least one external member and the first element, at least one second sensor having means for generating second signals indicating the positions of at least one of the at least one internal member and the second element, a central control unit having means for evaluating the first and second signals and for generating third signals, and means for disengaging the torque transmitting system in a planned manner in response to the generation of third signals. The evaluating means comprises means for adapting, at preselected intervals, those signals from at least one of the sensors which denote at least one of (a) a movement of at least one of the mobile components through a distance denoting a threshold of a movement which is required to shift the transmission into a selected gear ratio, (b) a movement of at least one of the mobile components to a position of rest when the shifting of the transmission into a selected gear ratio is completed, and (c) a movement which is necessary to shift the transmission from one gear ratio to another gear ratio. The evaluating means further comprises means for establishing one of (A) a difference between the first and second signals, and (B) a quotient of a difference between the characteristics of first signals at instants $t_1$ and $t_2$ and of a difference between the characteristics of the second signals at the instants $t_1$ and $t_2$. The third signals are generated when the adapted signals are indicative of one of (a) completion of the determination of the threshold of movement, (b) completion of the determination of movement to the position of rest, and (c) completion of determination of movement to shift the transmission from the one gear ratio to the other gear ratio. The torque transmitting system can include a clutch, such as a friction clutch.

An additional feature of the invention resides in the provision of a method of controlling or regulating the operation of an apparatus for adjusting an engageable and disengageable system serving to transmit torque in a power train wherein a transmission has a plurality of gear ratios and includes at least one mobile external gear ratio selecting member, at least one mobile internal gear shifting member, and a connection between the external and internal members, wherein first and second sensors are provided to respectively transmit first and second signals denoting variable parameters of the transmission, and wherein a control unit comprises means for receiving the first and second signals. The method comprises the steps of evaluating the first and second signals in the control unit, generating in the control unit third signals on the basis of the evaluated first and second signals, and disengaging the torque transmitting system by way of an adjusting device when the evaluation of the first and second signals results in the generation of a third signal denoting an intent to shift the transmission into a selected gear ratio.

The method can further comprise the step of connecting the control unit with at least one electronic circuit for a constituent of the power train, e.g., for a prime mover or the transmission, or for an antiblock system in a motor vehicle.

The signals from at least one of the sensors can indicate a threshold value of a position of the at least one external member at which the second signal is indicative of an intent on the part of an operator to shift the transmission into a selected gear ratio.

Alternatively, the signals from at least one of the sensors can indicate a threshold value of a distance which is covered by the at least one external member when the second signal denotes an intent on the part of an operator to shift the transmission into a selected gear ratio.

The evaluating step can include evaluating the first and second signals at intervals, establishing a first difference between the signals which are transmitted by one of the sensors at an instant $t_1$ and an instant $t_2$, establishing a second difference between the signals which are transmitted by the other of the sensors at the instants $t_1$ and $t_2$, dividing one of the differences by the other of the differences, and utilizing the thus obtained quotient to ascertain a threshold of a movement which is to be carried out by at least one of the external and internal members to shift the transmission into a selected gear ratio.

Alternatively, the evaluating step can include evaluating the first and second signals at intervals, establishing a first difference between the signals which are transmitted by one of the sensors at an instant $t_1$ and an instant $t_2$, establishing a second difference between the signals which are transmitted by the other of the sensors at the instants $t_1$ and $t_2$, dividing one of the differences by the other difference, and utilizing the thus obtained quotient to effect a movement of at least one of the external and internal members to a position in which such at least one member is held with a predetermined retaining force while the transmission dwells in a selected gear ratio.

The evaluating step can also include generating a quotient of differences between the intensities and/or other characteristics of signals which are transmitted by one of the sensors and signals transmitted by the other of the sensors. The quotient is indicative of a gradient $g_s$ of movement to be completed by at least one of the external and internal members to shift the transmission from a first gear ratio to a different second gear ratio, and the third signal is generated when a parameter of the gradient $g_s$ at least approximates a characteristic value.

For example, the gradient $g_s$ can be ascertained by the control unit by resorting to the equation $$g_s = |s_{s(i)} - s_{s(i-1)}| / |s_{G(i)} - s_{G(i-1)}|$$

wherein $s_{s(i)}$ denotes a signal from one sensor at an instant i, and $s_{G(i)}$ denotes a signal from the other sensor at the instant i.

The signal $s_{s(i)}$ can denote a variable parameter of the external member, and the signal $s_{G(i)}$ can denote a variable parameter of the internal member. The signals $s_{s(i)}$ and $s_{G(i)}$ can be obtained as a result of a transformation with $f(\alpha, \beta)$ to a common zero point position and identical amplitude in accordance with the following equation:

$$g_s = \alpha [|s_{s(i)} s_{s(i-1)}| + \beta] / |s_{G(i)} - s_{G(i-1)}|.$$

Alternatively, the evaluating step can include generating a quotient of differences between signals which are transmitted by one of the sensors and signals which are transmitted by the other sensor. The quotient can be indicative of a gradient $g_s$ of movement to be completed by at least one of the external and internal members in order to shift the transmission from a first gear ratio to a different second gear ratio. The third signal is generated when the gradient $g_s$ satisfies the equation $$g_s = \alpha_1[|s_{s(i)} - s_{s(i-1)}| + \beta_1]/\alpha_2[|s_{G(i)} - s_{G(31\ 1)}| + \beta_2]$$

wherein the summands $\beta_1, \beta_2$ and/or the factors $\alpha_1, \alpha_2$ are selected in such a way that $g_s$ assumes a fixed value when the at least one external member performs a movement in synchronism with a movement of the at least one internal member. The fixed value can equal one. Furthermore, such fixed value can be a constant value.

Moreover, the evaluating step can include generating a quotient of differences between signals which are transmitted by one of the sensors and signals which are transmitted by the other sensor. The quotient is indicative of a gradient $g_s$ of movement to be completed by at least one of the external and internal members to shift the transmission from a first gear ratio to a different second gear ratio. The gradient $g_s$ equals one when the at least one external member is moved in synchronism with the at least one internal member, $g_s$ is greater than one when the at least one external member is moved at a speed exceeding that of the at least one internal member, and $g_s$ is less than one when the at least one external member is moved at a speed below the speed of the at least one internal member.

Still further, the evaluating step can include generating a quotient of differences between signals which are transmitted by one of the sensors and signals which are transmitted by the other sensor. The quotient is indicative of a gradient $g_s$ of at least one of (a) a threshold of movement to be completed by at least one of the external and internal members in order to shift the transmission from a first gear ratio to a different second gear ratio, and (b) a movement of at least one of the external and internal members to a position in which the shifting of the transmission into a selected gear ratio is completed. The gradient $g_s$ is fixed or is adapted to a value corresponding to the transition from a value greater than one to a value less than one.

Moreover, the evaluating step can include an adaption of signals which denote one of (a) a threshold of movement of the at least one external member, and (b) a position of dwell of the at least one external member in a selected gear ratio of the transmission, and this independently for each of the gear ratios.

The evaluating step can also include identical adaption of signals denoting one of (a) a threshold of movements of the at least one external member, and (b) a position of dwell of the at least one external member in a selected gear ratio for each of the gear ratios.

Still further, the evaluating step can include an adaption of signals denoting one of (a) a threshold of movements of the at least one external member, and (b) a position of dwell of the at least one external member in a selected gear ratio of the transmission during at least one predetermined stage of operation of the transmission. The at least one stage can involve a shifting of the transmission from a neutral gear ratio into another gear ratio. Still further, the at least one stage can involve a shifting of the transmission into the neutral gear ratio from one of the other gear ratios (such as forward ratios one to five and a reverse gear ratio). Moreover, the at least one stage can involve shifting the transmission into the reverse gear ratio or into the first forward gear ratio. The at least one stage can also involve a starting of the apparatus or a starting of the engine in a motor vehicle which embodies the power train.

The novel features which are considered as characteristic of the invention are set forth in particular in the appended claims. The improved actuating apparatus itself, however, both as to its construction and mode of utilizing the same, together with numerous additional features and advantages thereof, will be best understood upon perusal of the following detailed description of certain presently preferred specific embodiments of the apparatus, and of certain presently preferred specific embodiments of the improved method, with reference to the accompanying drawings.

DESCRIPTION OF PREFERRED EMBODIMENTS

Figure 1:
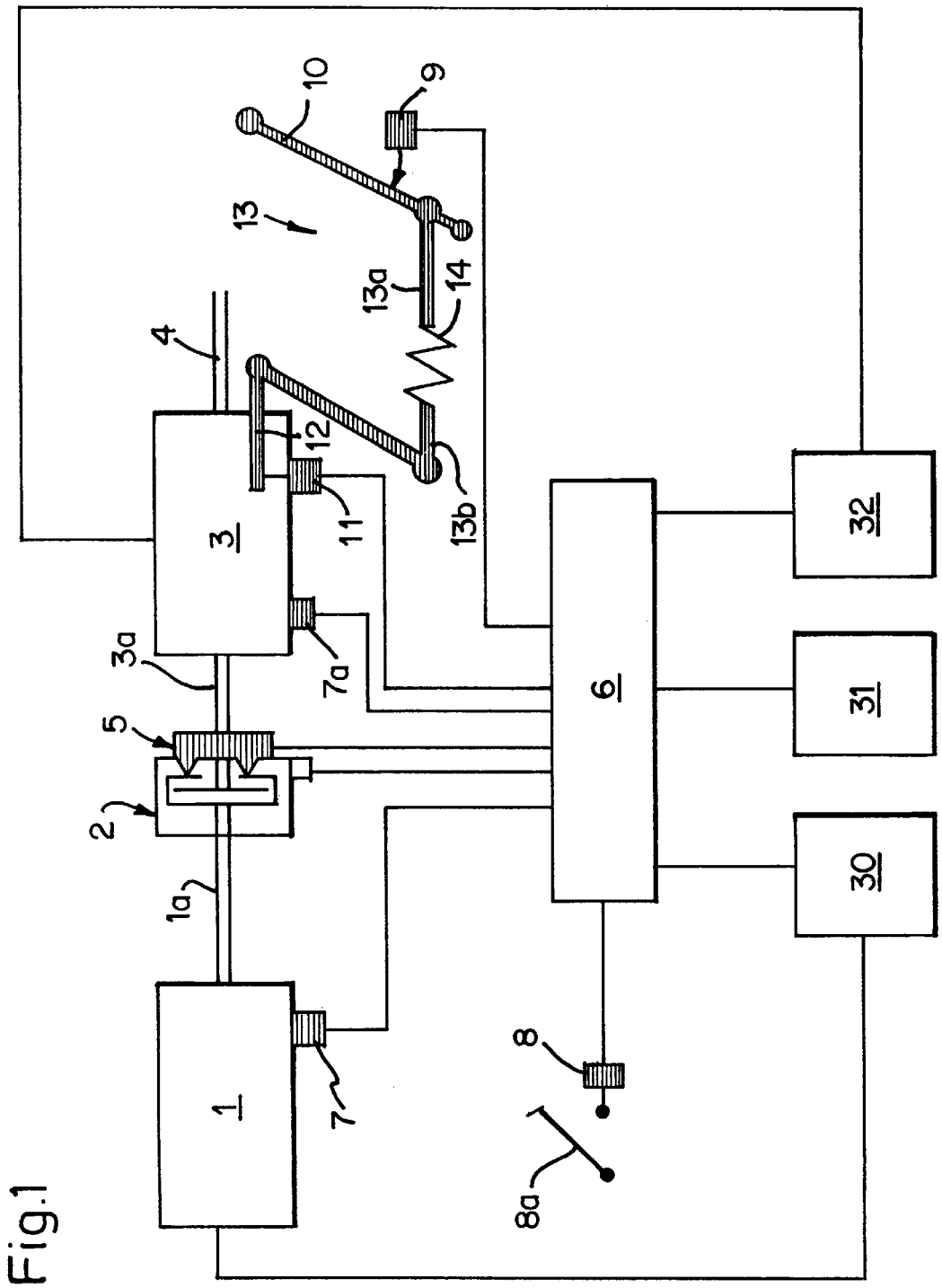
FIG. 1 is a schematic view of a portion of a motor vehicle wherein the improved apparatus is employed to control the transmission of torque by a clutch in the power train between the combustion engine and the manual transmission of the motor vehicle.
Figure 4:
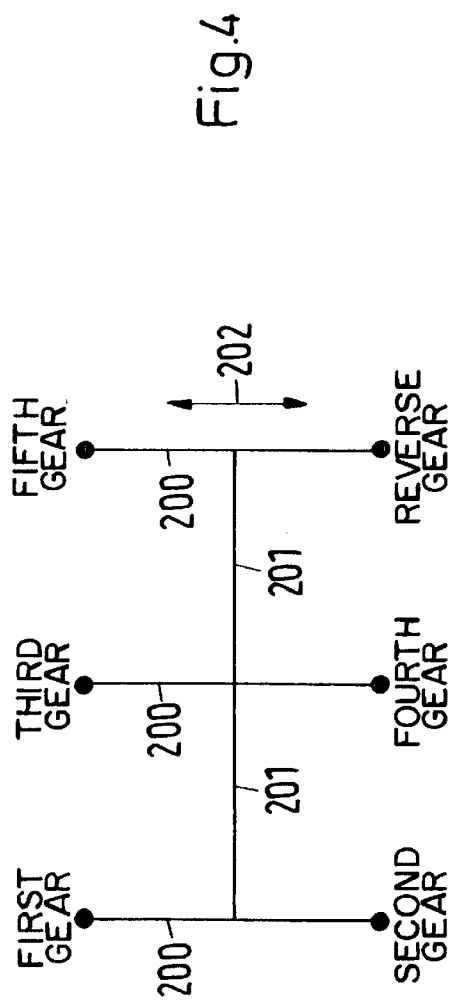
FIG. 4 is a diagrammatic view of the gear shifting gate in a transmission which can be utilized in the power train of FIG. 1.

FIG. 1 shows a portion of a motor vehicle including an apparatus for actuating (such as engaging or disengaging) an adjustable system 2 serving to transmit torque between a prime mover 1 (such as an internal combustion engine having a rotary output element 1a) and a manual transmission 3 having a plurality of gear ratios (this will be described with reference to FIG. 4). The adjustable torque transmitting system 2 can constitute a clutch, such as a friction clutch, which is shown as being installed in the power train between the output element 1a of the engine 1 and the rotary input element 3a of the transmission 3; however, it is also possible to install the system 2 (hereinafter called clutch for short) downstream of the transmission 3, e.g., between the output shaft 4 of the transmission and the axle (not shown) for the front or rear wheels of the motor vehicle.

The structure which is shown in FIG. 1 further comprises an electronic control unit 6 which receives signals from the outputs of several sensors and includes means for processing or evaluating signals from the various sensors and for generating signals which are transmitted to an actuating or adjusting means 5 (hereinafter called actuator) for the clutch 2. Since the illustrated clutch 2 is installed in the power train between the engine 1 and the transmission 3, the output shaft 4 is connected with the front or rear wheels of the vehicle by a further transmission (e.g., a differential) and the aforementioned axle.

The clutch 2 can constitute a friction clutch or any other suitable clutch, such as a magnetic particle or powder clutch or a hydrokinetic torque converter with or without a so-called bypass or lockup clutch. The actuator 5 can serve to engage or disengage the clutch 2 as well as to select the exact degree or extent of engagement of the clutch, e.g., to determine the extent of slip of the partially engaged clutch. As a rule, the clutch will be fully engaged (to transmit a maximum torque from the output shaft 1a to the input shaft 3a) only for relatively short intervals of time, i.e., only during certain very short-lasting stages of operation of the power train including the engine 1, the clutch 2 and the transmission 3. The control unit 6 is designed to transmit signals which enable the actuator 5 to effect an accurately planned operation of the clutch 2.

The actuator 5 can include a mechanically operated disengaging bearing for the clutch 2 and a suitable implement, such as a fork, which moves the bearing between a plurality of different positions to thereby adjust the rate of transmission of torque by the clutch 2. Instead of a fork, the actuator 5 can include a lever which is designed to move the bearing for the purpose of adjusting the rate of transmission of torque by the clutch 2. Alternatively, the actuator 5 can include a fluid-operated (i.e., hydraulic or pneumatic) clutch adjusting system including a master cylinder and a slave cylinder. Such fluid-operated system can influence a central disengaging member which can be mounted in such a way that it is coaxial with the input shaft 3a of the transmission 3. The slave cylinder of the fluid-operated system can transmit motion to a suitable implement, such as the aforementioned fork or lever, which in turn transmits motion to a clutch disengaging bearing. Still further, it is possible to employ an actuator which includes or constitutes an electric motor receiving signals from the control unit 6 and serving to adjust the clutch 2 so that the latter transmits torque having a desired magnitude.

The control unit 6 includes or can include a central computer and can include several outputs one of which transmits (second) signals to the actuator 5, another of which transmits signals to an electronic system 30 serving to control the operation of the engine 1, a third of which serves to transmit signals to an antiblock system (ABS) 31 of known design, and a fourth of which serves to transmit signals to an electronic system 32 which controls the operation of the transmission 3 in a manner not forming part of the present invention.

The transmission 3 further comprises an external member or device 10 which can be actuated by hand to select a particular gear ratio, an internal member or device 12 which serves to shift into a selected gear ratio, and a connection 13 between the members or devices 10, 12. The member or device 10 can constitute a pivotable lever, and the member or device 12 can constitute a shaft.

The sensors of the structure which is shown in FIG. 1 include a sensor 7 which transmits to the control unit 6 signals denoting the RPM of a rotary component (such as output shaft 1a) of the engine 1. A second sensor 7a serves to transmit to the control unit 6 signals denoting the RPM of a rotary component (such as the input shaft 3a) of the transmission 3. A third sensor 8 is provided to transmit to the corresponding input of the control unit 6 signals denoting the position of a gas pedal 8a of the motor vehicle, and a further sensor 9 is provided to transmit to the control unit 6 signals denoting the position or the distance covered by the selector lever 10 and/or an element 13a forming part of the connection 13 and being operatively connected with the lever 10. An additional sensor 11 serves to transmit to the corresponding input of the control unit 6 signals denoting the position and/or the extent of displacement of the shaft 12 and/or an element 13b forming part of the connection 13 and preferably sharing the movements of the shaft 12. The apparatus of the present invention can further include various speed monitoring devices (tachometers), sensors which monitor the position (such as inclination or angle) of the throttle valve, additional RPM monitoring devices and/or other types of sensors which can generate signals denoting the values, magnitudes and/or other variable characteristics of various parameters. The signals which are transmitted to the corresponding inputs of the control unit 6 are evaluated, processed and (at least temporarily) converted into signals which are transmitted to the electronic systems 30, 31 and 32 and to the actuator 5. Signals which are generated by the control unit 6 can indicate the intent of the operator of the motor vehicle to shift the transmission 3 into a different gear ratio. For example, the duration of (first) signals transmitted by the sensor 9 and/or 11 can be indicative of the operator's intent to change the gear ratio of the transmission 3.

Levers of the type shown at 10 are standard parts of manual transmissions. The lever 10 is manipulated by the operator of the motor vehicle whenever the operator desires to shift the transmission into a selected forward gear ratio, in reverse or into neutral. The connection 13 can be designed to transmit motion from the lever 10 to the shaft 12 or to another internal component part of the transmission, e.g., to a rod, a link or a shifting fork, not specifically shown. All that counts is to ensure that a selected movement of the external member or device 10 entails a corresponding or commensurate movement of the internal member or device 12 of the manual transmission 3.

As a rule, or at least in many instances, the connection 13 is set up in such a way that it permits or causes a certain play between the lever 10 and the shaft 12. Furthermore, the connection 13 comprises or can comprise at least one resilient element (schematically indicated in FIG. 1 by a coil spring 14) which serves to prevent the transmission of vibratory and/or other stray movements between the lever 10 and the shaft 12 and/or to stress the other constituents of the connection 13 and/or uncople the lever 10 from the shaft 12 during certain stages of movement of the lever and/or shaft. The resilient element 14, or an equivalent thereof, can be installed anywhere between the handle or knob of the lever 10 and the shaft 12 or another internal element of the transmission 3. The connection 13 can comprise one or more articulated joints (such as between the lever 10 and the element 13a and/or between the element 13b and the shaft 12), and at least one such joint can comprise one or more resilient elements in addition to or in lieu of the resilient element 14.

As already mentioned above, signals which are being transmitted by the sensor 9 and/or 11 are evaluated, processed and converted in the control unit 6 into signals which are transmitted to the actuator 5 to engage, to disengage or to otherwise adjust or influence the clutch 2, i.e., to select the magnitude of torque which is being transmitted from the output shaft 1a of the engine 1 to the input shaft 3a of the transmission 3. The sensor 9 of FIG. 1 is positioned to transmit signals denoting the position and/or the distance covered by the lever 10 from a predetermined position, either by directly monitoring the positions of the lever 10 and/or by monitoring the positions of the element 13a which is assumed to share the movements of the lever 10. The sensor 11 is positioned to monitor the positions and/or the distances covered by the shaft 12 and/or by the element 13b which latter is assumed to share the movements of the shaft 12 or to perform movements which are related to (e.g., proportional with) the movements of the shaft 12.

The elements 13a and 13b are component parts of the connection 13. However, it is equally within the purview of the invention to use the element 13a solely as an adjunct to the lever 10, i.e., as a means for sharing the movements of the lever 10 and for causing the sensor 9 to transmit signals denoting the positions and/or the extent of displacement of the lever 10. Analogously, the element 13b can constitute an adjunct of the shaft 12, i.e., it need not form part of the connection 13 but can serve the sole purpose of influencing the sensor 11 so that the latter transmits signals accurately denoting the positions and/or the extent of displacement of the shaft 12.

For example, if the operator of the vehicle decides to move the lever 10 from a position corresponding to the first gear ratio to a position corresponding to the neutral gear of the transmission 3, the initial stage of the movement of the lever 10 eliminates the aforementioned play in the connection 13 between the lever 10 and the shaft 12. In other words, such initial stage of movement of the lever 10 from the position corresponding to the first gear ratio of the transmission does not entail any movement of the shaft 12 (or of another mobile internal member or device of the transmission 3, such as a rod, a fork, an oscillatory component or the like). The next stage of movement of the lever 10 (beyond that movement which is required to overcome the aforementioned play) can involve a deformation (such as upsetting or stretching) of one or more elements of the connection 13 (e.g., a shortening or a stretching of the resilient element 14). Such deformation of one or more elements of the connection 13 is attributable to the elasticity and/or to other characteristics of such element or elements.

In accordance with a feature of the invention, the aforediscussed play and/or the aforediscussed characteristics of one or more elements of the connection 13 are utilized to ascertain the presence or absence of an intent on the part of the operator of the vehicle to shift the transmission 3 into a different gear ratio (this involves shifting into a selected forward speed, into neutral and into reverse). In other words, it is not absolutely necessary to provide a resilient element in addition to one or more resilient elements (such as 14) in the connection between the lever 10 and the shaft 12. This means that one can eliminate one or more additional resilient elements by the simple expedient of utilizing the resilient element or elements of the connection 13 as a component of the means for ascertaining the presence or absence of the operator's intent to shift into a selected gear ratio. However, it is within the purview of the invention to employ one or more resilient elements outside of the connection 13, for example, if the connection is relatively stiff or rigid, i.e., if none of its elements can undergo the required deformation upon elimination of the play in the connection 13 as a result of pivotal, linear and/or other operator-induced movement for the purpose of changing the gear ratio of the transmission 3.

Signals from the sensor 9 and/or 11 are also utilized to ascertain the existence or absence of existence of an intent to shift the transmission 3 into a selected gear ratio. Signals from the sensor 9 are indicative of the movement of the lever 10 in the direction of so-called shifting paths in the gear shifting gate of the transmission 3 for the lever 10. Reference may be had to FIG. 4 which shows that the transmission 3 of FIG. 1 has a total of five forward gear ratios (denoted "first gear", "second gear", "third gear", "fourth gear" and "fifth gear"), a "reverse gear", and a neutral gear ratio. It is clear that the manual transmission the gear shifting gate of which is shown in FIG. 4 is but one of several transmissions which can be installed in the power train including the prime mover 1 and the clutch 2 of FIG. 1. For example, the transmission which receives torque from the engine 1 by way of the clutch 2 can have four or six forward speed ratios.

The operative connection between the lever 10 and the sensor 9 (either directly or by way of the element 13a) can be such that the signals from the sensor 9 to the corresponding input of the control unit 6 are indicative of the gear shifting and/or of gear selecting movement or distance covered by the lever 10. For example, the arrangement can be such that the gear shifting or the gear selecting movement exerts a dominant influence upon the signals which are evaluated, processed and transmitted by the control unit 6 to the actuator 5 to influence the torque which is being transmitted by the clutch 2. If the signal denoting the gear selecting movement is the dominant signal, the signal which is generated to indicate the gear shifting movement exerts a relatively small or negligible influence upon the overall signal being transmitted by the sensor 9 to the control unit 6.

The sensor 11 is designed and installed to transmit signals denoting the movement of the shaft 12 and/or of one or more elements which share the movements of the shaft 12 or perform movements which are commensurate to those of the shaft 12. It is preferred to set up the sensor 11 in such a way that the movements of the shaft 12 in the gear shifting direction are the source of signals which are being evaluated and processed to ascertain whether or not the operator intends to change the gear ratio of the transmission 3.

It is also possible to set up the sensor 9 in such a way that the determination of the presence or absence of an intent by the operator of the vehicle to change the gear ratio of the transmission is ascertained (either primarily or exclusively) on the basis of monitoring of gear ratio selecting movements of the lever 10. In such apparatus, it is desirable to ensure that the sensor 9 transmits signals having a sharp resolution irrespective of the direction of movement of the lever 10.

The control unit 6 is designed to evaluate and process the signals from the sensor 11 and/or 9 (and, if necessary, signals from one or more additional sensors, such as the sensor 7 and/or the sensor 7a) to accurately ascertain the position of the shaft 12 and/or the lever 10 and to generate and transmit at least to the actuator 5 signals which denote whether or not the operator of the vehicle intends to shift the transmission 3 into a different gear ratio. Of course, it is possible and often desirable to rely for such determination upon a plurality of various criteria, i.e., not only upon signals from the sensor 11 and/or 9.

Let it be assumed that the operator of the vehicle embodying the structure of FIG. 1 has decided to move the lever 10 in a direction to change the gear ratio of the transmission 3. Such movement of the lever 10 is detected by the sensor 11 and/or 9 which transmits to the control unit 6 a signal denoting the magnitude of the force which is being applied to the lever 10 and/or the extent of movement of the lever 10. The signal is processed by the control unit 6 in a sense to ascertain and to signal that there exists an actual intent to shift the transmission 3 into a different gear ratio. In accordance with a feature of the invention, the signal from the control unit 6 to the actuator 5 then induces the actuator to disengage the clutch 2, i.e., to interrupt the transmission of torque from the output shaft 1a of the engine 1 to the input shaft 3a of the transmission 3, or to otherwise interrupt the transmission of torque to the transmission.

The interruption of torque transmission (e.g., by disengaging the clutch 2) can be followed by a manual change of the transmission ratio, e.g., by shifting from one forward gear ratio into a different forward gear ratio, by shifting into neutral or by shifting into reverse.

When the manual manipulation of the transmission 3 is completed, e.g., when the procedure involving a shifting from one forward gear ratio into another forward gear ratio is completed, such completion of the manipulation is ascertained (either by resorting to an estimation or an evaluation procedure). This can be readily accomplished by employing the sensor 11 and/or the sensor 9 and/or one or more additional sensors to indicate the new position of the lever 10 and/or the shaft 12 and/or the element 13a and/or the element 13b. At such time, the apparatus proceeds with a strategy to reengage the clutch 2 or to otherwise reestablish (if necessary) an optimum torque transmitting connection between the engine 1 and the transmission 3.

The control unit 6 can be designed to transmit (second) signals which are based on the (first) signals transmitted by the sensor 11 and/or 9 and denoting the position(s) of one or more members or elements or devices forming part of the transmission 3. Alternatively, the second signals can denote differences between various first signals and/or quotients of such differences. As a rule, the positions and/or the distances which are denoted by the first signals are the positions of or the distances covered by the lever 10, by the shaft 12 and/or by one or more elements (such as 13a, 13b) which form part of the connection 13 and share the movements of the member 10 or 12 or move at a rate which is proportional to that of the movement of the member 10 or 12.

When the signal denoting a given position of the member 10 and/or 12 or an element which shares the movements of such members departs from the aforementioned difference or a quotient of differences or a given threshold, the control unit 6 generates a signal which is indicative of an intent of the operator of the vehicle to change the setting of the transmission 3, and such signal is transmitted to the actuator 5 which disengages the clutch 2 preparatory to manual shifting of the lever 12 to a different position. The intensity or another characteristic of the signal denoting the aforementioned given position can exceed or can be less than the intensity or another characteristic of the difference signal or quotient signal or threshold value signal.

The threshold values (such as those denoting given positions of or given distances covered by the member 10 and/or 12 and/or the element 13a and/or 13b, those denoting the disengagement of the clutch, those denoting certain differences between first signals, and/or others) can be readily ascertained on the basis of predetermined tolerances and/or predetermined fluctuations of characteristics of the relevant parts of the transmission plus preferably a safety factor. The safety factor is or can be selected in such a way that it denotes a distance or another variable parameter which is sufficient to ensure that the threshold positions are not within the range of tolerances or stray movements of the members and/or elements which are monitored by the sensor 11 and/or 9. In other words, the preselected threshold value for a position, a difference of positions or a quotient of differences is selected with a view to ensure that it is outside of the range of values which can be arrived at as a result of the aforediscussed play in the connection 13, tolerances in the manufacture of the member 10 and/or 12 and/or of the element 13a and/or 13b and/or the deformability of such members and/or elements.

Figure 2:
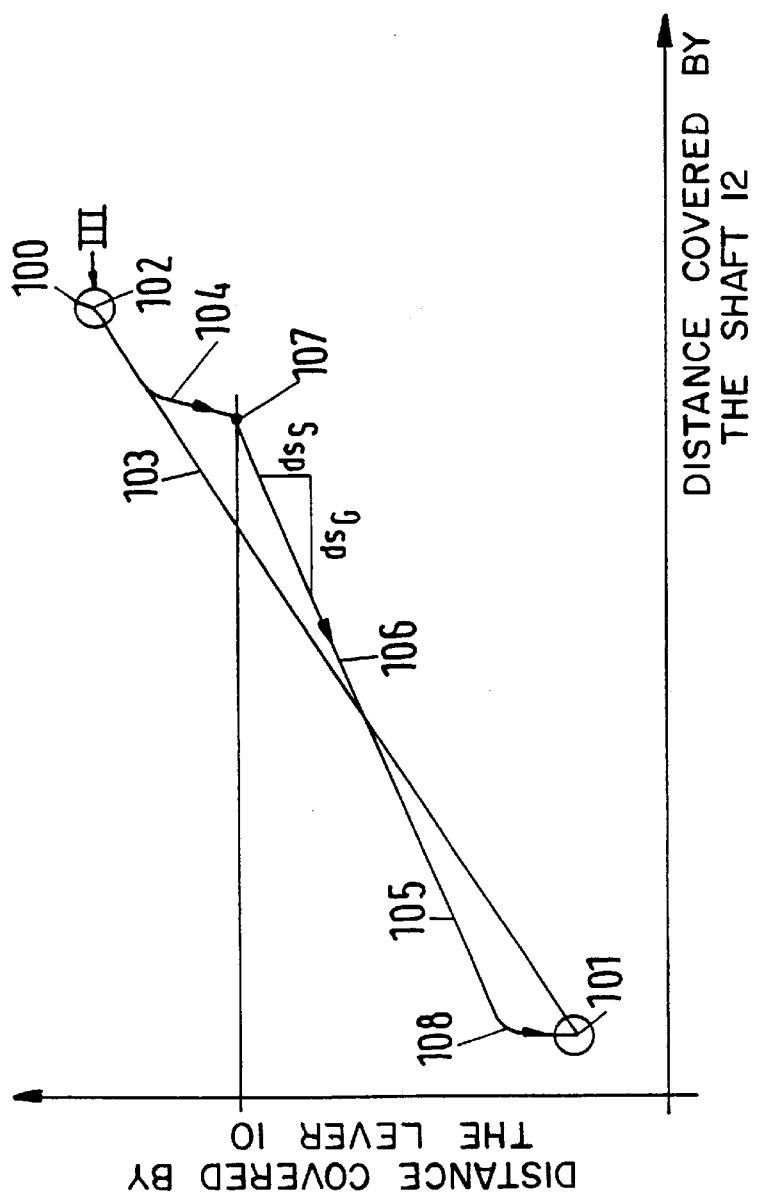
FIG. 2 is a coordinate system with curves indicating the relationship between the distances covered by two mobile components of the manual transmission.

In the coordinate system of FIG. 2, the distances covered essentially by the lever 10 and/or by one or more elements (such as 13a) which directly or indirectly share the movements of the lever 10 are measured along the ordinate. The distances covered essentially by the shaft 12 and/or by one or more elements (such as 13b) which at least indirectly share the movements of the shaft 12 are measured along the abscissa. The point 100 on a curve 103 denotes a selected gear ratio (e.g., the "first gear") of the transmission 3, and the point 101 on the same curve 103 denotes another ratio, e.g., the neutral position of the transmission 3. In order to shift from the gear ratio denoted by the point 100 on the curve 103 to another ratio (such as that denoted by the point 101), the operator of the motor vehicle moves the lever 10 through a predetermined distance as measured along the ordinate in the coordinate system of FIG. 2. Such movement of the lever 10 is carried out in response to the exertion of a given force exceeding a retaining force which is exerted upon the lever 10 to maintain it in a selected position when the gear ratio of the transmission 3 is to remain unchanged. In other words, the retaining force must be overcome whenever the operator desires to move the lever 10 from a previously selected position (e.g., that denoted by the point 100) to a different position (e.g., that denoted by the point 101).

In accordance with a feature of the invention, the apparatus which is shown in FIG. 1 is designed in such a way that the control unit 6 generates a signal denoting the existence of an intent on the part of the operator to shift into a different gear ratio when the force acting upon the lever 10 exceeds the aforementioned retaining force of the transmission 3, at least by a predetermined value (e.g., by a preselected percentage).

Figure 3:
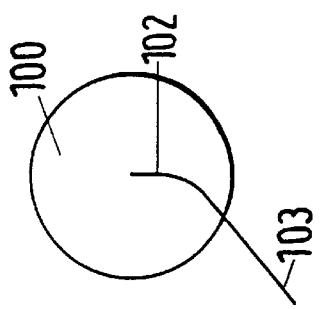
FIG. 3 is an enlarged view of a detail within the circle III in the coordinate system of FIG. 2.

When the clutch 2 is disengaged by the actuator 5 in response to a signal from the control unit 6, the lever 10 is first moved through a distance which is necessary to overcome the aforediscussed play in the connection 13, i.e., between the lever 10 and the shaft 12. In other words, only the lever 10 is set in motion whereas the position of the shaft 12 remains unchanged during that stage of movement of the lever 10 which is necessary to eliminate the play in the connection 13. Such movement of the lever 10 relative to the still stationary shaft 12 is indicated at 102 (FIGS. 2 and 3). It will be seen that such movement is substantially vertical (as seen in FIG. 2 or 3), i.e., parallel with the ordinate because the lever 10 moves relative to the shaft 12 and element 13b. The positions of the shaft 12 and the element 13b remain at least substantially unchanged.

The next stage of movement of the lever 10 from the position indicated at 100 to that indicated at 101 elimintes eventual play of the element 13b and/or the shaft 12 in the transmission 3. When such play is eliminated, further movement of the lever 10 toward the (neutral) position indicated by the point 101 on the curve 103 of FIG. 2 entails a movement of the shaft 12 to a position which the shaft 12 assumes when the transmission 3 is in neutral. The curve 103 denotes such joint movement of the lever 10 and shaft 12 toward their respective neutral positions. The last stage of such movement takes place along one or more suitably inclined ramps or other suitable components which are provided to furnish the aforediscussed retaining force, i.e., a force which prevents unintentional movements of the lever 10 and shaft 12 from their selected positions. In other words, at least one of the parts including the lever 10 and the shaft 12 is held with a preselected retaining force when it reaches the position corresponding to that shown at 101 in the coordinate system of FIG. 2. The curve 103 denotes such joint movements of the lever 10 and shaft 12 (while the lever 10 is being moved from the point 100 to the point 101 on the curve 103) which take place if one disregards the friction encountered by the lever 10 and/or element 13a and/or element 13b and/or shaft 12. It can be said that the lever 10 and the shaft 12 move in at least substantial synchronism.

The movement of the shaft 12 toward the neutral position is decelerated or delayed when the shaft 12 reaches and moves along the aforementioned ramp or an analogous device which is provided to furnish the retaining force, i.e., to prevent unintentional movement of the shaft 12 from the neutral position. Of course, the same result can be achieved if the ramp or an analogous retaining device is placed adjacent the path of movement of the element 13b or any other element which is compelled to share the movements of the shaft 12. On the other hand, the lever 10 continues to move toward the position denoted by the point 101 at an unchanged rate with the result that one or more elements of the connection 13 are deformed (e.g., stretched and/or upset). Such deforming action can involve one or more elements of the connection 13 and/or the lever 10. The just discussed departure of movement of the lever 10 from that of the shaft 12 is shown in FIG. 2, as at 104. Again, that portion (at 104) of the curve denoting the actual movement of the lever 10 from the position denoted at 100 to the position denoted at 101 is at least substantially parallel to the ordinate because the lever moves relative to the shaft 12. The curve 103 can be said to constitute a kinematic characteristic curve. The curve 105 in the coordinate system of FIG. 2 is indicative of the actual movement of the lever 10 (relative to the movement of the shaft 12) from the point 100 to the point 101 on the characteristic curve 103. The slope of the signal curve 105 at 104 can be more pronounced or less pronounced than that of the kinematic characteristic curve 103.

When the force which is being applied to the lever 10 to move it toward the position indicated by the point 101 overcomes the retaining force acting upon the shaft 12 and/or upon one or more elements sharing the movements of this shaft, the movement of the shaft 12 is accelerated until the aforementioned deformation of one or more elements of the connection 13 and/or of the lever 10 is eliminated. This is indicated by the portion 106 of the curve 105 in the coordinate system of FIG. 2. Acceleration of the shaft 12 begins at 107, and the shaft 12 thereupon moves at a speed which exceeds the speed of movement of the lever 10. This can be readily seen in FIG. 2 which shows that the slope of the curve 103 is more pronounced than that of the curve 105. Otherwise stated, the slope of the curve 105 ahead of the point 107 is more pronounced than downstream of or past such point. Another retaining force must be overcome by the shaft 12 when the latter approaches the neutral position, and this is shown at 108. The slope of the curve 105 changes accordingly. It will be seen that the shaft 12 must overcome a retaining force (at 104) when it leaves the position corresponding to the first gear ratio and that the shaft must again overcome a retaining force (at 108) in order to reach the neutral position.

If the signals denoted by the curve 105 are considered as a function of time, one can readily ascertain a transition from a delayed or slower movement of the internal member or shaft 12 of the transmission 3 to an accelerated movement as soon as the retaining force (opposing the movement of the shaft 12 from the position corresponding to the first gear ratio) is overcome.

The signals which are being transmitted to the control unit 6 and denote the positions of the lever 10 can constitute quotients of signals generated by the sensors 9 and 11, i.e., quotients of signals denoting the positions of the lever 10 and the shaft 12. An intent to shift the transmission 3 into a different gear is then detected when the signals transmitted from the sensors 9, 11 to the control unit 6 indicate a change of speed (acceleration or deceleration) of the lever 10 and/or the shaft 12. For example, this can involve a change in the intensity and/or other characteristics of the signals being transmitted by the sensors 9, 11 and being evaluated and processed in the control unit 6.

In practicing the method of the present invention, it can be of advantage to operate independently of the speed of movement of the lever 10 and/or shaft 12 and to rely, instead, upon the distances covered by the member or device 10 an/or 12. If the gear shifting distance gradient is calculated on the basis of signals furnished by sensors which monitor the just mentioned distances as a quotient of the speed of selecting movement of the lever 10 and the speed of shifting movement of the shaft 12 in the transmission 3, one obtains a value which, in the first approximation, is -independent of the speed of gear ratio selecting movement of the lever 10 because the criteria which are being relied upon to ascertain the existence or absence of gear shifting intent on the part of the operator of the vehicle are the same when the lever 10 is moved at a relatively low speed as when the lever is moved at a higher speed.

When one resorts to the just outlined method, one can detect a transition of the quotient $g_s$ from a starting value, thrugh a characteristic value and on to a target value. A preceding standardizing of the gear shifting distances and/or of gear shifting velocities of the lever 10 and/or of the shaft 12 can ensure that, in the event of synchronized movements of several gear ratio selecting and/or gear shifting members or devices, such as the lever 10 and the shaft 12, the value of $g_s$ equals zero, that the quotient $g_s$ is greater than zero if the speed of the lever 10 exceeds the speed of the shaft 12, and that the quotient is below zero if the speed of the shaft 12 exceeds the speed of the lever 10. If one resorts to such a procedure, an intent to shift into a different gear ratio (i.e., to change the setting of the transmission 3) can be detected if the quotient $g_s$ changes from a value greater than zero to a value below zero, or vice versa. The limit value $g_s=1$ is indicated in FIG. 2, as at 107. The kinematic curve 103 of FIG. 2 is then indicative of such limit value $g_s=1$.

When the sensor 11 transmits a signal which indicates that the shaft 12 has been caused to engage a ramp or another suitable retaining force applying component but the lever 10 continues to perform its movement toward a newly selected position (e.g., from that indicated by the point 100 toward that indicated by the point 101 in the coordinate system of FIG. 2), the value of gradient $g_s$ exceeds one. In an extreme case when the sensor 11 does not indicate any movements of the shaft 12 but the sensor 9 continues to indicate a movement of the lever 10, the value of the gradient $g_s$ rises toward infinity. Once the retaining force of the ramp or ramps or analogous retaining force supplying means is overcome, the sensor 11 again transmits signals which denote a renewed movement of the element 13b, of the shaft 12 or of another element sharing the movements of the shaft 12; the speed of such movement of the shaft 12 can match or exceed the speed of movement of the lever 10 (as detected by the sensor 9). At such time, the gradient $g_s$ (denoting the extent of movement to change the gear ratio of the transmission 3) again equals, or at least approximates, one.

Depending upon the exact design of the ramp or ramps and/or other yieldable retaining means for the shaft 12 in a selected position, one can select a threshold value for the gradient $g_s$. When the value of $g_s$ decreases from above to below the selected threshold value, one can ascertain the position of the lever 10 for the purpose of automatically selecting (e.g., by adaption) the threshold value of the gradient $g_s$.

For example, the adaption can be realized by resorting to a weighted summing up of a signal denoting the determined position of the lever 10 and a signal denoting the threshold value of the gear ratio selecting movement.

It is also possible to determine or adapt a threshold value of the gear selecting movement for each of the various gear ratios or settings of the transmission 3, i.e., for the reverse gear, for the first gear, for the second gear, and so forth. Alternatively, one can select a first threshold value for a first group of gear ratios at one side of the neutral position or setting (note the first, third and fifth gears in FIG. 4), and a different second threshold value for a second group of gear ratios at the other side of the neutral position or setting (note the second, fourth and reverse gears in FIG. 4). Still further, it is possible to select identical threshold values of $g_s$ for each gear ratio; this simplifies the determination of the threshold value because it suffices to select the threshold value of $g_s$ for a single gear ratio and to rely on the same threshold value for all other gear ratios.

FIG. 3 shows, drawn to a larger scale, that portion of the characteristic curve 103 of FIG. 2 which is confined within the circle III. It shows the steep portion 102 which is indicative of the initial movement of the lever 10 from the position indicated at 100 toward the position indicated at 101, namely that stage of movement of the lever 10 which is needed to eliminate the play in the connection 13 between the lever 10 and the shaft 12.

Referring again to FIG. 4, the element 13a and/or the lever 10 is movable along a gear ratio selecting path 201. Several gear shifting paths 200 (one for each of the five forward gears and one for the reverse gear) branch off the gear ratio selecting path 201. The double-headed arrow 202 indicates the directions of movements from the path 201 into and along a selected path 200 or vice versa. As already mentioned above, the gear shifting gate of FIG. 4 denotes the gate of but one of a plurality of different manual transmissions which can be operated in accordance with the method and by resorting to the apparatus of the present invention.

Figure 5:
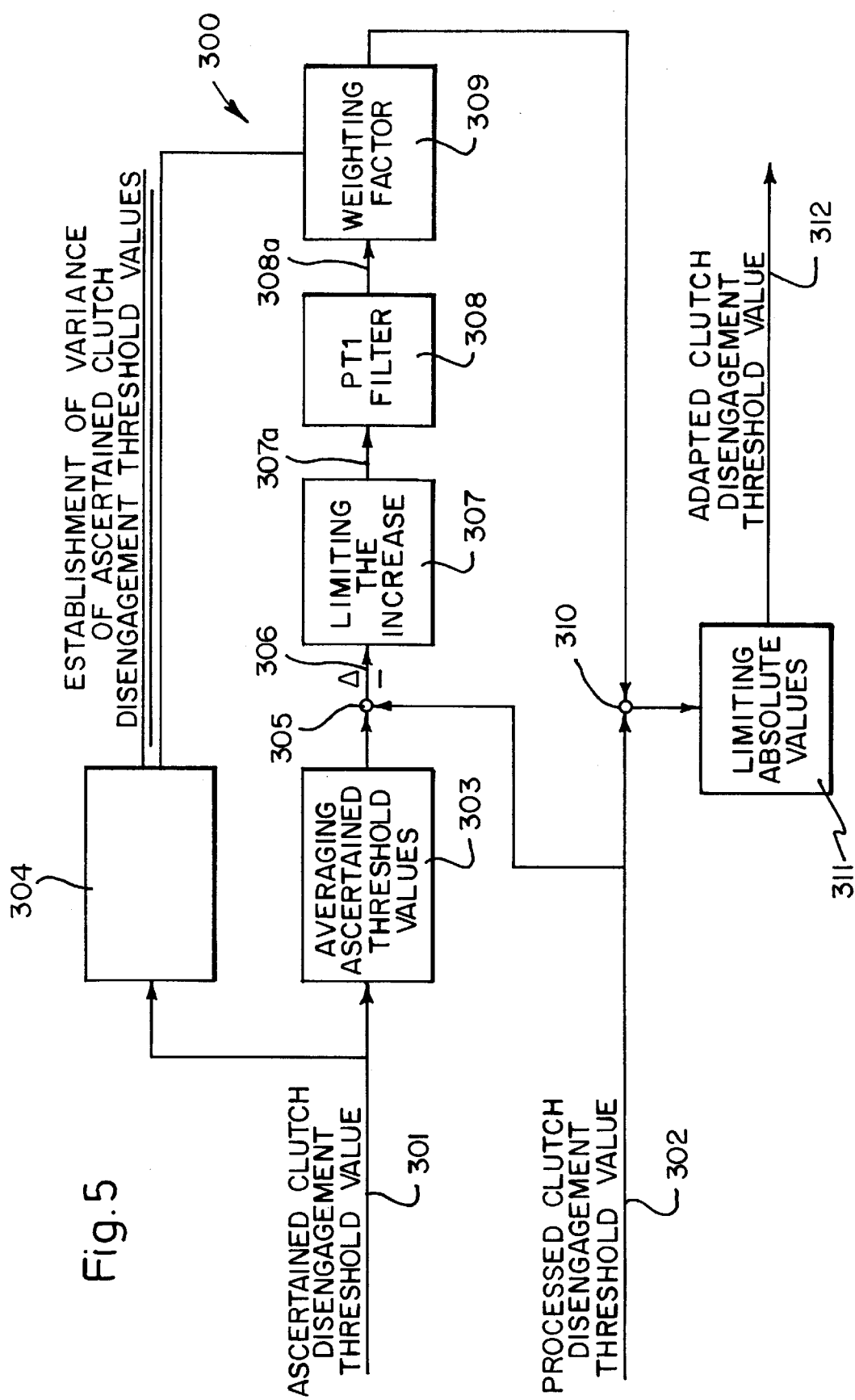
FIG. 5 is a block diagram denoting the operation of a control unit which can be utilized in the apparatus of FIG. 1.

FIG. 5 shows a block diagram 300 which represents an adaption of threshold values for the determination, by the control unit 6, of an operator's intent to move the lever 10 in order to select a different transmission gear ratio.

As used in this specification and in the claims, an adaption of a value (such as of a threshold value which is being relied upon to detect an intention to change the gear ratio of the transmission) is intended to denote a method or a process of conforming to or at least stepwise approaching or following up the actually arising variations of a value or quantity, such as a physical variable, by the value of a parameter denoted by signals which are evaluated and processed in the control unit 6. In this manner, the parameter which represents a value or a magnitude and which is represented by signals being evaluated and processed in the control unit 6 conforms to or approximates or follows, at least on the basis of one term or condition, the represented value or magnitude.

It is of advantage if the value of the parameter exactly conforms to the represented value or magnitude, such as a physical variable or parameter. However, it can also be of advantage (under certain circumstances) if the value of the parameter denoted by the signals being evaluated and processed by the control unit 6 approximates the represented value or magnitude. As already explained hereinbefore, the approximation can be carried out in a stepwise fashion, namely by identical steps or by variable steps, the actual dimensions or extent of the steps being a function of the operating point or of the difference between the actual value (such as a physical variable) and the value of the parameter, particularly a given percentage of the actual value.

Adaption of the threshold value (a) of the position of the lever 10, (b) of the position of the shaft 12, (c) of the position of the element 13a, (d) of the position of the element 13b, (e) of another element performing movements commensurate with those of the lever 10, (f) of another element performing movements commensurate with those of the shaft 12, (g) of the aforediscussed differences, and/or (h) of the aforediscussed quotients will be explained in greater detail with reference to FIG. 5. The physical or calculated values must match or must depart from (i.e., they must be less than or they must exceed) the threshold values in order to cause the control unit 6 to transmit a signal which is indicative of an operator's intent to change the gear ratio of the transmission 3, i.e., to transmit a signal which causes the actuator 5 to disengage the clutch 2. The corresponding signal from the control unit 6 to the actuator 5 is indicative of a clutch disengagement threshold. In other words, a disengagement threshold is a threshold value which must be reached or passed (upwardly or downwardly) by a monitored value in order to effect an actuation (such as controlled disengagement) of the clutch 2.

For example, at least one threshold of a distance, a force, a difference between distances, or a quotient of differences, which threshold is to be evaluated by the control unit 6 to determine the presence or the absence of an intent to change the gear ratio of the transmission, can be ascertained during completion of the power train in a motor vehicle or on another occasion, such as during testing or during repair of the vehicle in a workshop or garage or in the course of a planned calibration. The thus obtained information pertaining to the threshold value is memorized and/or otherwise fixed to be thereupon utilized as a disengagement threshold whenever the signal from the control unit 6 indicates that the clutch 2 is to be disengaged preparatory to a change of the gear ratio of the transmission 3.

One can ascertain the maximum possible distance or the maximum possible difference between the distances covered by two members or devices in the course of a gear shifting operation. On the basis of such information, one first selects and fixes a threshold value, namely a value which is reached at a desired relatively early or relatively late stage of manual operation of the lever 10 by the operator of the motor vehicle. In this manner, one ensures that the intent to shift into a different gear ratio is not determined prematurely, e.g., due to the development of vibrations and/or other undesirable stray movements which should not initiate a change in the gear ratio of the transmission 3.

On the other hand, the disengagement of the clutch 2 should not be carried out too late, e.g., at a time when the operator is already in the process of shifting the transmission 3 into a different gear ratio.

The arrow 301 which is shown in FIG. 5 denotes the ascertained (measured) threshold values of disengagement of the clutch 2; such threshold values can represent input values which are processed in a manner as indicated by various blocks in the diagram 300 of FIG. 5. Signals denoting the clutch disengagement threshold values are indicated at 302; such signals are evaluated and processed in the control unit 6 of FIG. 1.

The block 303 in the diagram 300 of FIG. 5 denotes the determination of an average value for the ascertained clutch disengagement threshold values. By way of example, such threshold values can be ascertained and measured or monitored in the aforediscussed manner on the basis of a maximum value which is ascertained in the course of a gear shifting operation.

The block 304 in the diagram 300 of FIG. 5 represents the establishment of a variance of the ascertained clutch disengagement threshold values. It represents an average value obtained from some or all of the clutch disengagement threshold values which are ascertained within a predetermined interval of time and satisfy the conditions or terms of adaption. The block 304 can also denote the determination of a variance of the thus obtained sampling. In the case of an adaption of thresholds of the disengagement distances or paths, one can ascertain—as a function of time—the maximum stretching or expansion of the resilient element 14 which is ascertained during the interval that is relevant for the adaption such as the interval between the turning on of the vehicle engine ignition system and the turning off of the ignition system. Alternatively, one can ascertain the maximum difference between the distances covered by the monitored members, devices and/or elements. The thus obtained information can be averaged and/or otherwise processed. For example, the averaged value can be compared with a memorized or otherwise stored value. If the divergence of the ascertained value from the memorized value exceeds the predetermined threshold value, the memorized value can be altered, e.g., adapted, by a preselectable increment or decrement. For example, such altering procedure can take place, as a function of time, only once during each operation of the vehicle, i.e., only once between the starting and the stoppage of the engine.

The character 305 in the diagram 300 of FIG. 5 denotes the calculation of a difference between the average value (as ascertained at 303) and the signals which are furnished by the control unit 6 for a clutch disengagement threshold value. The thus ascertained difference 306 is processed at 307 and 308. The block 307 denotes a means for limiting the increase, i.e., the departure of the measured or ascertained average value (see the block 303) from the actual threshold value 302 which is processed in the control unit 6. The block 308 includes or represents means for filtering the signals (denoted by the arrow 307a) which are transmitted by the means denoted by the block 307. For example, the filter represented by or utilized in the component denoted by the block 308 can be a PT-1 filter; however, it is also within the purview of the invention to employ other types of filters.

The block 309 represents means for furnishing a weighting factor in dependency upon the variance provided in the block 304, such variance being an indication of the quality of information denoted by the average value (block 303). The weighting factor (block 309) is multiplied by the value denoted by the arrow 308a. The character 310 denotes the step of adding the weighted and filtered increase to the actual value, and the block 311 denotes the limiting or restriction of the absolute value obtained from the freshly ascertained clutch disengagement threshold value. The arrow 312 represents the adapted clutch disengagement threshold value.

Figure 6:
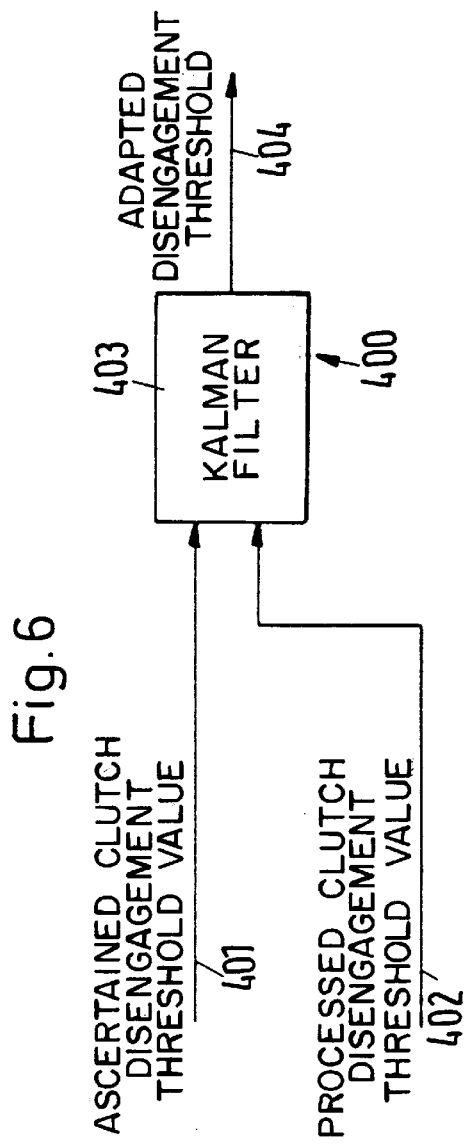
FIG. 6 is a block diagram denoting the operation of a modified control unit.

The block diagram 400 of FIG. 6 represents a mode of adaption wherein 401 denotes the ascertained (measured) disengagement threshold and 402 denotes the value of the disengagement threshold in the form of a parameter such as can be processed by the control unit. The signals denoting the values 401 and 402 are transmitted to a recursive parameter estimator 403, such as a Kalman filter, having an output 404 for signals representing the adapted value of the disengagement threshold. A Kalman filter can be used to process data, such as for example those obtained as a result of measurements, which contain pronounced disturbance fractions (spurious components). Such a filter can take into consideration not only the measured values and those values which are actually processed in the control unit, but also the variations of such values. For the disengagement threshold of each gear ratio of the transmission, there is implemented a recursive filter which, when the adaption conditions are met or satisfied, actualizes the value which is utilized in the control unit. The filter is initialized, once or more than once, with fresh or new starting conditions within an operational period such as the interval between the instant of turning on the ignition system and the instant of turning off the ignition system. The following are the equations for each filter, for example, a discrete filter for each gear ratio:

$$x_1 = x_o + k^*(y_1 - x_o)$$

$$p_1 = (1-k)^* p_o$$

$$k = p_o/(p+n),$$

wherein $x_o$ is the initial value of the disengagement threshold, $p_o$ is the initial value of the variance of the disengagement threshold, $x_1$ is the adapted value of the disengagement threshold, $p_1$ is the value of the variance of the disengagement threshold subsequent to adaption, n is a variance of disturbances in the measurements, and $y_1$ is the measured or ascertained disengagement threshold.

It can also be of advantage if a position of an element in the connection 13 between the lever 10 and the shaft 12 (or a component movable with the shaft 12) is monitored by one or more sensors which ascertain various positions or various distances, and the displacement of such component takes place against the opposition of a resilient element (such as the coil spring 14 in the connection 13 of FIG. 1), i.e., if the displacement (change of position) of the mobile element or component or member or device must be effected in response to the exertion of a force; such force constitutes a signal denoting an intent to shift the transmission 3 into a different gear ratio when the magnitude of the force (i.e., the intensity or another characteristic of the corresponding signal) exceeds a threshold value, namely when the extent of displacement of the monitored part exceeds a given threshold value. The mobile part (e.g., the element 13b) can be displaced relative to a stationary component or relative to a mobile component, and the measurement or monitoring can involve a determination of the extent of displacement of the mobile element relative to such stationary or movable component.

It can be of advantage to employ sensors which are designed to generate signals denoting distances covered by a mobile element. The sensors which are utilized for the practice of the present invention can be so-called non-contact object detectors (such as Hall generators) or sensors (e.g., potentiometers) which are in direct or indirect contact with the monitored element(s).

In accordance with a further feature of the invention, it can be of advantage if an adaption of the at least one threshold value which is evaluated or processed by the control unit is carried out or avoided on purpose (i.e., in a planned manner), and the detection of threshold values takes place also within an operational range without (i.e., outside of) the adaption. It is well known that the elasticity of resilient elements (such as the element 14 shown in FIG. 1) can change as a function of external influences, such as for example the temperature. The resilient element 14 (which need not always be a coil spring but can also constitute or include an elastic part of a suitable synthetic plastic material) is likely to change its elasticity under the influence of the temperature of the surrounding atmosphere and/or the temperature of the engine 1 and/or the temperature of the transmission 3. As a rule, the stiffness of the material of the resilient element 14 (or its equivalent or equivalents) will increase in response to increasing temperature, and this entails that the operator of the motor vehicle must exert a greater force in order to effect a certain displacement of the lever 10, i.e., a certain deformation of the resilient element 14, when the stiffness of such resilient element increases under the influence of a higher temperature. Moreover, the aforediscussed play in the connection 13 can change (it can increase or decrease) in response to the aforementioned temperature changes.

It can happen that, as a consequence of a change of the stiffness of the resilient element 14 (and of the resulting change of play in the connection 13), the force which an operator must exert upon the lever 10 must be greatly increased before it entails a displacement which can be detected and interpreted as denoting an intention to change the gear ratio of the transmission. In other words, it is then necessary to exert a greater, or even much greater, force in order to move the lever 10 and/or the element 13a and/or the element 13b and/or the shaft 12 through a distance or to a position which can be detected by the sensor 9 and/or 11 and interpreted by the control unit 6 as denoting an intent to change the gear ratio of the transmission 3. This, in turn, can result in such pronounced change (rise) of the disengagement threshold (i.e., of the force which is necessary to initiate (by way of the control unit 6 and the actuator 5) a change in the transmission of torque by the clutch 2) that the operator must exert an undesirably large force in order to cause the actuator 5 to adjust the clutch 2.

For example, the aforediscussed adaption can be influenced or curtailed as a function of changes of the temperature of the engine 1 and/or as a function of temperature changes in the interior of the motor vehicle. The arrangement can be such that an adaption is prevented when the temperature (e.g., of the engine 1 or in the passenger compartment or in the driver's cabin) of a vehicle is below a preselected value. Alternatively, the signals which are generated while the temperature is below a given value can be suppressed, e.g., such signals are not processed or averaged.

It is also possible to vary or modify, as a function of the temperature, the threshold values which are used to ascertain the intent to change the gear ratio of the transmission. The dependency of the function upon the temperature can be effected or resorted to only above or below a preselected temperature.

When the determination of an intent to change the gear ratio is to be carried out on the basis of signals denoting differences between positions or distances, it can be of advantage if the threshold values of a difference between distances which are to be reached while the vehicle is in motion can be determined, for example, on the basis of values determined when the vehicle is being set in motion. The threshold value of the force which is necessary to indicate an intent to change the gear ratio of the transmission, which is arrived at on the basis of the difference evaluating procedure, and which constitutes a threshold of a difference between distances, can be memorized as a disengagement threshold.

It is possible to practice the novel method in such a way that one detects the maximum developing distances or a maximum developing force for effecting a movement between the position "transmission shifted into a certain gear ratio" and the position "transmission in neutral". Such maximum developing force can be ascertained, or the maximum developing difference between the distances can be ascertained, when the clutch is engaged or disengaged or when the clutch is in the process of being disengaged in the course of the monitoring step. If the clutch is disengaged, the maximum level of the force or the maximum difference between distances corresponds essentially to the retaining force, i.e., to the force with which the shaft 12 and/or another part is yieldably held in a particular gear ratio of the transmission; such force opposes the movement of the shaft 12 from a previously selected position. If the clutch is engaged, the calculated maximum force or the force corresponding to the maximum difference between distances or positions need not necessarily match the retaining force.

It is often desirable if the threshold of the difference between distances, as calculated by taking into consideration the elasticity of the resilient element 14 (or its equivalent or equivalents) in the connection 13 between the lever 10 and the shaft 12 (e.g., between the locus of monitoring by the sensor 9 and the locus of monitoring by the sensor 11), corresponds to a force which either matches the retaining force or exceeds or is less than the retaining force by a preselectable value.

Due to the development of short-lasting, medium long and/or long-lasting changes in the physically present threshold of the force, it is of advantage if that value of the threshold force which is being transmitted to and is being evaluated and processed by the control unit 6 (or an equivalent control unit) at least approximates a physically arising or developing value of the threshold of the force. If the threshold of the force or the threshold of the difference between the distances does not conform to the physically existing circumstances, the ride of the vehicle is likely to lack the expected or required comfort. For example, in the event of short-lasting or medium long or long-lasting fluctuations of the aforementioned variable parameters, such as can be caused by eventual changes of the temperature, by wear, by aging, or as a result of changes of play within the overall assembly which participates in the shifting of the transmission into a different gear ratio, there develops a change of the level or magnitude of the force which is to be applied by the operator to the lever 10 or an equivalent mobile external member or device or element of the transmission; such change of the force to be applied to the lever 10 can be quite pronounced so that the application of such force might cause considerable discomfort to the operator of the motor vehicle.

The aforementioned fluctuations cause a change of the forces or of the value or magnitude of the forces during actuation so that the selected thresholds and/or the thresholds or limit values utilized for the practice of the method, for example, to initiate an intention to shift into a different gear ratio or to retain the various members, devices an/or elements in the positions corresponding to a newly selected gear ratio should be adapted to the changed circumstances. The fixing of a threshold or a limit value of a force or a difference between distances for the initiation of an intent to change the gear ratio of the transmission to a maximum of the retaining force can result in a premature or in a delayed initiation of an intent to change the gear ratio if the threshold remains unchanged but the retaining force changes; this can cause considerable discomfort to the operator of the motor vehicle.

Basically, the disengagement threshold which is to be ascertained depends upon the aforediscussed maximum developing retaining force which, in the event of changed circumstances, could lead to a different threshold as a result of adaption. An adaption renders it necessary to detect the prevailing retaining force $F_{Rast}$. The entire progress of the actuating force F as a function of the actuation distance s cannot be detected under any and all circumstances, i.e., it can happen that the force F can be ascertained or detected only during certain stages of movement through the distance s. It is also possible to detect the maximum value of the actuating force as a retaining force.

Figure 7:
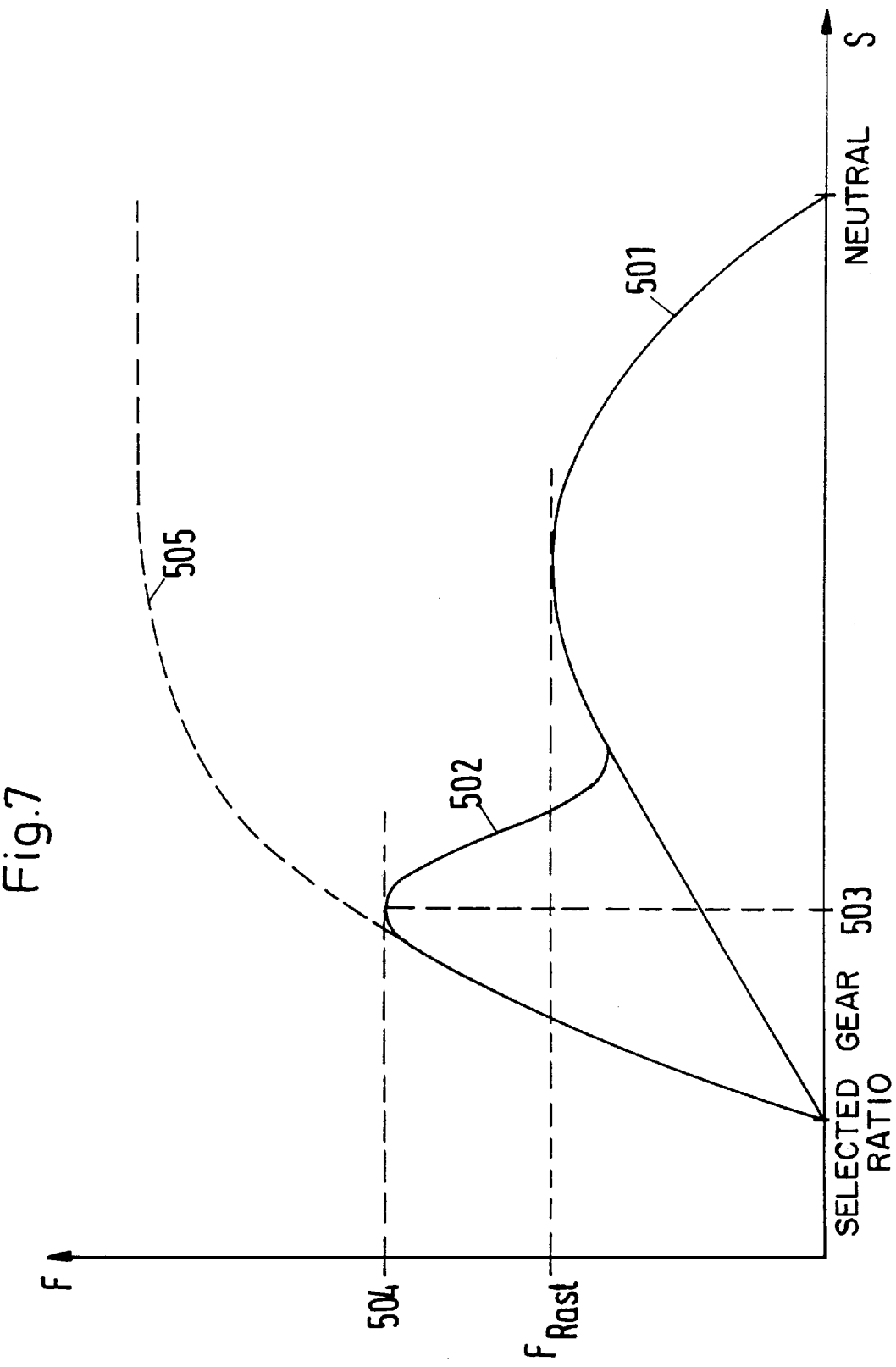
FIG. 7 is a coordinate system wherein the curves denote the relationship between the magnitudes of a variable force acting upon and the distances covered by a mobile component of the transmission.

In the coordinate system of FIG. 7, the actuating force F is measured along the ordinate, and the distance s covered, e.g., by the lever 10 is measured along the abscissa. The curve 501 intersects the abscissa at a first point corresponding to a selected gear ratio and at a second point corresponding to the shifting of the transmission into neutral gear. This curve 501 denotes the progress of the force which is required to move the lever 10 as a function of the distance s when the clutch (such as the clutch 2 shown in FIG. 1) is disengaged. Thus, under such circumstances, the clutch is disengaged not because a disengagement threshold of the force or of a difference between distances has been reached but rather because, for example, one reaches a threshold of an actuation velocity of the lever 10 or another mobile component of the transmission 3. When the force F reaches the magnitude $F_{Rast}$, the curve 501 reaches its highest point denoting essentially the retaining force in the transmission. When the retaining force $F_{Rast}$ is reached, the transmission is shifted from the previously selected gear ratio as a result of overcoming the retaining force, and the magnitude of the force F then decreases.

The curve 502 represents in FIG. 7 a force-distance relationship when the clutch 2 is engaged at the onset of a change of the gear ratio of the transmission. When the lever 10 has covered the distance 503, the force F reaches a value 504 which corresponds to the threshold force required to disengage the clutch. Thereupon, the curve 502 slopes downwardly and merges into the curve 501, and the retaining force $F_{Rast}$ becomes detectable.

However, if the disengagement threshold is too high, the clutch is not disengaged and the progress of the curve 502 is that as shown at 505, i.e., the retaining force FRast is not detectable because it is less than that denoted by the broken-line portion 505 of the curve 502.

By detecting the retaining force $F_{Rast}$, one can determine a disengagement threshold, e.g., as the magnitude of a force or as the difference between distances. The disengagement threshold can be selected, in dependency upon the retaining force, as a threshold value $F_{Auskuppel}$ of a force or as the threshold $\Delta s_{Auskuppel}$ of a difference between distances. For example, one can rely on the following equations:

$F_{Auskuppel} = A*F_{Rast} + B$, and $\Delta s_{Auskuppel} = C*(C_o \cdot F_{Rast} + D_o + D)$.

Under such circumstances, it is advisable for adaption of the disengagement thresholds that the clutch be disengaged, either during one or more stages of, or during the entire, transmission operating movement; this renders it possible to detect the retaining force $F_{Rast}$ in a manner and on the grounds as outlined hereinbefore.

It is also advisable to utilize the ascertained retaining force $F_{Rast}$ for the adaption of the disengagement thresholds only when the actuating movement takes place at least substantially progressively toward the neutral region or the neutral position. Thus, it is of advantage to detect the retaining force while the actuation or movement of the lever 10 is not being interfered with.

Furthermore, it is of advantage if an adaption of the threshold values takes place only and alone in the absence of sensor errors. Thus, no error bit or bits which is or which are indicative of an error by a sensor should be set. For example, such error bits can be set by the control unit 6 (or another suitable control unit) when the values of the signals transmitted by the sensors are not within a preselected range of values. If the control unit detects such departures of values denoted by the signals furnished by the sensors, the control unit can set an error bit which indicates that such error has arisen or developed at least once, for example, during the then prevailing stage of operation.

A determination or adaption of disengagement thresholds can be carried out independently for each of the gear ratios reverse and first to fifth or, alternatively, for groups of gear ratios, such as a first group including the reverse, the first, the third and the fifth ratios, and a second group including the second, fourth and sixth ratios (it is assumed here that the transmission has six forward ratios). For example, such groups can be assembled on the basis of a functional relationship in the gear shifting gate of the employed transmission.

It is of great advantage if the to-be-adapted values of the threshold(s) are based upon a detection of the force(s) and each such force is ascertained at least once, preferably more than once, during each adaption procedure. However, it is also possible to carry out a minimum number of actual transmission gear ratio shifting procedures as a prerequisite for an adaption; in such instances, the control unit (such as 6) can be set up to count the number of gear ratio changing procedures within a particular stage of operation. Based on the magnitudes of the forces which are ascertained per gear shifting operation, such as the maximum force, one can ascertain an average value in the course of a short-lasting, medium long or long-lasting adaption and the threshold can be adapted, for example, as an averaged value per stage of operation, upon completion of each stage. The average value of the ascertained magnitudes of the force can be calculated and memorized immediately upon completion of a stage of operation. In the case of a short-lasting adaption, a conformance of the threshold can be effected basically as soon as the magnitude of the force is ascertained.

If the adaption is carried out for each of two or more groups of transmission gear ratios, one can resort to a weighting of the magnitudes of the force or of the values denoting the differences between distances in order to adapt the thresholds. The individual values can be provided with a weighting factor which can depend, for example, upon the selected and active gear ratio.

Upon completed detection or ascertainment of the maximum actuating force while the clutch (such as the clutch 2) is disengaged, the value of the threshold can be altered by a limited addition or deduction per adaption step. The length or extent of the steps can be selected in advance and can be a function of the difference between the actual threshold and the calculated desired or ideal threshold. It can also be of advantage if the threshold is set to conform to the actually determined ideal threshold and is memorized.

For example, in actual use, an adaption of disengagement thresholds, or of threshold values which must be reached during actuation to disengage the clutch, can be effected for the detection of an intent to shift into a different gear ratio on the basis of a difference between distances (for example, during a longer-lasting change or as a result of an emergency adaption) by relying, e.g., upon a sensor error.

When the apparatus is in actual use, and when shifting into a different gear ratio, one ascertains the actual stretching and/or other type of deformation (hereinafter referred to as stretching) of the external member(s) or device(s) and/or element(s) during shifting from a position in which the transmission is in a given gear toward the neutral position. The control unit calculates the difference between the characteristics of the signals from the sensors (such as the sensors 9 and 11), and the thus ascertained difference is proportional to the magnitude of the developing gear ratio shifting or changing force. In the next step, the calculated extent of actual stretch is taken over and is ascertained as a result of continuous comparison between the maximum developing stretching during the interval between a stage when the lever 10 or an equivalent thereof is idle (i.e., the transmission has been shifted into a given gear ratio) and a stage when the transmission is in neutral. If the neutral position of the actual gear ratio has been reached, the gear ratio-dependent disengagement threshold for the detection of an intent to shift into a different gear ratio in dependency upon a difference between distances can be set to match the previously determined maximum value of the stretch.

For the operation of the improved apparatus, one can resort to two or more adaption procedures for different purposes. An adaption of clutch disengagement thresholds which is intended to ensure a longer-lasting equalization can involve the determination, within a stage of operation, of the gear ratio dependent average values of the measured maximum stretch of the external member(s) or device(s) and/or element(s) while the transmission is being shifted from a previously selected gear ratio. The thus ascertained average values are thereupon resorted to once at the termination of the particular stage of operation to adapt the disengagement thresholds for the control unit.

The same as during starting of the prime mover, one can ascertain the actual stretch of the external member(s) or device(s) and/or element(s) in the course of the actual use or operation of the motor vehicle. Thus, by resorting to a continuous comparison, one can ascertain the maximum value of the stretch between an instant when the transmission has been shifted into and dwells in a particular gear, and the instant when the transmission is in neutral. In contrast to the aforedescribed mode of operation during starting of the prime mover (such as the engine 1), one ascertains the maximum stretch while the clutch is engaged as well as while the clutch is disengaged. When the clutch is engaged, the ascertained extent of stretch is not utilized for the purposes of adaption. This can be skipped at least during one stage of the operation. The extent of stretch which is ascertained while the clutch is disengaged can be utilized for the purposes of adaption.

It is desirable that, prior to utilizing the ascertained maximum stretch for the calculation or determination of the average value for the respective gear ratio, one satisfies at least one of the following conditions or prerequisites:

(a) The intent to shift into a different gear ratio should have been recognized or detected on the basis of a strategy which is dependent upon a procedure depending upon the shifting speed (PT1 strategy).

(b) One should ascertain the maximum value of the stretch while the clutch is disengaged.

(c) The ascertained maximum value of the stretch, while the clutch is disengaged, should exceed the maximum value of the stretch while the clutch is engaged (the difference between the distances when the clutch is disengaged should correspond to or should be proportional with the level of the retaining force).

(d) The error bits for the signals from the sensors should not be set.

If at least one of the above conditions (or another condition) is met, the maximum value of the stretch when the clutch is disengaged is utilized for the actualization of the average value per stage of operation.

The actual adaption of disengagement thresholds prior to memorizing of the adaptive parameters is carried out at the termination of a stage of operation (ignition off). In accordance with a first procedure, the first step involves the ascertainment of a weighted average value for each group of gear ratios (such as 1/3/5 and 2/4/R in the transmission 3), namely a weighted average value of differences between the disengagement thresholds determined for each gear ratio and the actual values in the control unit (such as 6). This ascertainment of weighted average values involves only those average values from the particular stage of operation which are based upon at least two events or occurrences. The ascertained average increase per group of gear ratios is thereupon limited at most to one increment and the disengagement thresholds of the gear ratios are caused to conform in the next step.

The second procedure is intended to be resorted to in the event of pronounced and abruptly developing changes of the positions of external member(s) or device(s) and/or element (s), such as necessitates a rapid conformance of the disengagement thresholds and, therefore, could not be achieved at all, or could be achieved only at a rate which is too slow, by resorting to the previously described first procedure. Thus, and once one detects a continuous or ongoing intent to shift into a different gear ratio, the value of the disengagement threshold is increased at least by a few increments and the thus obtained value is limited to a range of values, e.g., between 0 and 1000. In the next step, the average value of the disengagement thresholds which has been ascertained up to such point in time is restored and a flag is set up. If the continuous or ongoing intent to shift into a different gear ratio does not disappear, the here described segment is effective again during the next-following invocation or sampling. When the particular stage of operation is completed, a single adaption is performed, the same as in the case of the first strategy with the ascertained average values of the disengagement thresholds following an emergency adaption. However, if the flag has been set up, the conformance does not take place in dependency upon the groups of gear ratios but rather separately for each gear ratio. It is necessary that at least one event has actually occurred and the entire increase of the disengagement thresholds within the range of operation is taken over.

It can be of advantage if the values (such as those of a disengagement threshold) which are ascertained at selected temperatures or within preselected temperature ranges are resorted to as a measure for the dependency of various parameters or values upon the temperature. The temperature dependencies which are formed in the control unit can be corrected or influenced by the above values. For example, the disengagement thresholds can be formed or determined as a function of the temperature, e.g., as a function of the changes of temperature of lubricant in the engine or as a function of changes of oil temperature in the transmission. In this manner, one can memorize the threshold values in the form of a temperature-dependent characteristic field and the memorized threshold values are addressed as a function of the temperature.

As used herein, the term "control" or "regulation" is intended to denote not only a procedure without a feedback of a value within an open regulating path but also a procedure with feedback within a closed regulation path wherein a control difference involving a departure of the actual value from a desired or prescribed value is eliminated. An adaptive control procedure can compensate, on the basis of long-range correction, for departures from an ideal value.

The intent of an operator to shift into a different transmission gear ratio by exerting a force upon an external member, device and/or element of the transmission is ascertained on the basis of signals which are furnished by one or more sensors and are processed in any one of the manners outlined hereinbefore. The progress of the change of the condition can be indicated as a result of setting of a bit. As already mentioned above, it is possible to resort to any one of a number of different methods of ascertaining the presence or absence of an operator's intent to change the gear ratio of the transmission.

To summarize, one presently preferred method of ascertaining a driver's intent to shift can involve the transmission (a) of a signal from a first sensor (such as 9) which monitors the actuation (displacement of and/or the application of a force to) of a mobile device, member and/or element (such as the lever 10), and/or (b) of a signal from a second sensor (such as 11) which detects the movements of one or more internal devices, members and/or elements (such as the shaft 12). The signal or signals are normalized, sealed or standardized in such a way that they denote essentially the same range of values. This can be achieved, for example, in dependency upon the gear ratio or upon, the path toward or from a particular gear so that the signals furnished by the sensor or sensors assume the same values in all gears and in all gear paths, starting from the neutral gear. For example, the standardizing can be carried out on the basis of values which are obtained when the motor vehicle is set in operation or on the basis of adaption values such as the positions of the members and/or devices and/or elements when the transmission has been shifted into and dwells in a gear or in neutral within the gear shifting gate. In the next step, the signals from the sensor or sensors are used to ascertain a difference between distances or between signals. The thus obtained value (denoting the difference between distances or signals) is indicated or pointed out with a certain resolution, for example, the increment /10. Such values of a difference are an indication of the force acting or being required to act upon an external member, device and/or element (such as the lever 10) in order to move the shaft 12 from a position corresponding to a particular gear ratio. An indication of an intent to change the gear ratio of the transmission is or can be considered to exist when the difference-denoting signal exceeds a value corresponding to a preselected threshold value or limit value or the intensity or another characteristic of such signal drops below such preselected threshold value.

Alternatively, the detection of the generation or establishment of an intent to shift into a different gear ratio can be arrived at by resorting to a velocity-dependent procedure. This involves basically a detection of the speed of movement of an external and/or internal member, device or element of the transmission (such as the lever 10 and/or the shaft 12 of the transmission 3). As already discussed hereinbefore, a detection of the speed of movement of one or more selected parts of the transmission can involve the resort to a filter (such as a PT1 filter) for the signals from one or more sensors, for example, from the sensor 9 for the lever 10 or for an element which shares the movements of this lever. For example, such (processed or unprocessed) position- or distance-dependent signals from the sensor 9, which signals are determined as a function of time, can be utilized to ascertain (e.g., by resorting to an appropriate calculation) the speed of movement of the monitored member, device and/or element.

The evaluation of an original signal and/or of a processed or modified signal and/or of a filtered signal can involve a monitoring or checking of a threshold value or limit value.

For example, if a characteristic of a distance-denoting signal generated by a sensor monitoring the movements of the lever 10 exceeds the corresponding characteristic of a filtered signal by more than a predetermined offset, for example a fixed value plus a value corresponding to the angle or orientation of the throttle valve in the motor vehicle, i.e., the so-called DKLW*prop factor, an intention on the part of the operator to shift into a different gear ratio can be set as a bit.

Reliance upon a value which is dependent upon the angle of the throttle valve renders less likely the development of an unintentional (undesired) initiation of an intent to shift; this is desirable because such dependency upon the angle of the throttle valve greatly reduces the likelihood, or actually eliminates the possibility of, an unintentional initiation of an intent to shift when the vehicle is expected to perform at a high or a very high rate.

If the velocity threshold is not exceeded, the control unit determines (or can determine) whether or not the calculated difference between distances exceeds a threshold which is a function, for example, of a gear ratio or a gear ratio selecting path. If such is the case, the signal from the control unit indicates an intent to shift;

otherwise, no such signal is transmitted by the control unit.

If any one of the distance-indicating sensors happens to malfunction or is out of commission for another reason, the procedure based upon the determination of a difference between distances can be discontinued because the control unit is no longer capable of ascertaining differences between distances, i.e., between signals expected to be furnished, for example, by the sensors 9 and 11. If the velocity threshold of an external member, device or element (such as the lever 10) or of an internal member, device or element of the transmission is not exceeded, this can result in a resetting or restoring of the temporary intent to shift into a different gear ratio. The temporary intent by the operator to shift into a different gear ratio is used, in conjunction with other conditions or prerequisites, to generate a signal denoting an intent to shift and the clutch is disengaged in response to the generation of such signal.

In this context, one can distinguish in the gear shifting gate (FIG. 4), of the transmission 3 or another transmission having fewer or more than five forward gear ratios, between a narrow neutral range, a wide neutral range, and a further range of shifting into a forward gear or into reverse. The narrow neutral range is defined and bounded by neutral range thresholds. The further range is limited by gear ratio thresholds. The wide neutral range is located between the thresholds for the narrow neutral range and the gear ratio thesholds.

If the lever 10 is located within the narrow neutral range, the intent to shift is restored or reestablished. If the lever 10 happens to be within another range, one can ascertain whether or not the temporary or preliminary intent to shift exists and whether or not, at the same time, for example the engine RPM (see the sensor 7 in FIG. 1) and/or the angle of the throttle valve and/or the actual engine torque and/or the actuation of the gas pedal 8a (see the sensor 8 in FIG. 1) is below a preselected threshold value and/or whether the idling switch, the hand brake and/or the service brake has been actuated. If such is the case, the signal from the control unit can indicate an intent to shift into a different gear ratio.

It is presently preferred to resort to the improved apparatus and to apply the improved method in connection with the shifting of a manual transmission (e.g., a transmission wherein the lever 10 is provided with a knob which can be engaged and moved by the operator of the motor vehicle). It is also possible to resort to the improved method and apparatus in connection with the manipulation of automatic or automated transmissions wherein the shifting into different gear ratios need not be performed by the operator.

The signals which are being transmitted by the sensor 11 can be influenced or manipulated in such a way that they actually denote the movements of and/or the magnitudes of the forces acting upon the external member 10, i.e., the same as the signals from the sensor 9. It is also possible to omit the sensor 9 or 11 and to utilize a single sensor for the transmission of signals denoting the positions of and/or the distances covered by and/or the magnitudes of the forces acting upon at least one mobile component (such as 10, 13a, 12 or 13b) of the transmission.

As already mentioned above, the signal evaluating means of the control unit 6 or an equivalent control unit can generate signals (for transmission to the actuator 5) under a number of given circumstances, for example, when the extent of movements carried out by a mobile component of the transmission (such as the extent of movements carried out by the lever 10) is yet to reach or has reached or has exceeded at least one preselected (fixed or variable) threshold value. The same results can be obtained when the sensor or sensors serving to transmit signals to the control unit are set up to transmit signals which denote the magnitude of forces acting upon one or more mobile components of the transmission. That magnitude of the force acting upon a selected mobile component which is required or selected to initiate an adjustment of the condition of the clutch (i.e., which is indicative of an intent to shift the transmission into a different gear ratio) may but need not be identical with the retaining force $F_{Rast}$ which the transmission applies to one or more mobile components upon completed shifting of the transmission into a selected gear ratio. It is often preferred to select the retaining force in such a way that its magnitude exceeds that of the force which is indicative of the intent to shift the transmission into a different gear ratio. For example, the ratio of such forces cant be between about 0.5 and 0.95, particularly between about 0.6 and 0.9.

An adaption of signals denoting various threshold values can be effected by the control unit when the transmission is being shifted into the neutral gear ratio or, alternatively, into a gear ratio other than the neutral gear ratio. It is also possible to carry out such adaption while the transmission is in neutral or after the shifting of the transmission into another gear ratio has been completed. Still further, it is possible to carry out an adaption of one or more signals denoting one or more threshold values (for the purposes of generating a signal denoting an intent to shift the transmission into a different selected gear ratio) while the clutch is disengaged and/or under one of the following possible circumstances: (a) in the course of a low-speed gear shifting operation, (b) in the course of a rapidly effected gear shifting operation, (c) when the gear shifting operation is being carried out while the engine of the motor vehicle is idle, (d) when the gear shifting operation is carried out while the engine is running, (e) when the transmission is shifted out of a previously selected gear ratio, and (f) during shifting of the transmission into a selected gear ratio.

The transmission of a signal from the evaluating means of the control unit to the actuator 5 can be utilized to disengage the clutch or to ensure that the clutch remains disengaged during shifting of the transmission into a newly selected gear ratio. The termination of shifting of the transmission into a selected gear ratio can be ascertained by monitoring the position and/or the dynamics of one or more mobile components of the transmission, e.g., of the external member or lever 10.

It is often preferred to select the aforediscussed retaining force $F_{Rast}$ in such a way that the control unit recognizes the intent to shift the manual or automatic transmission into a selected gear ratio when the force acting upon the lever 10 or another mobile component of the transmission rises to or exceeds the retaining force; this can be determined by monitoring the positions of and/or the distances covered by and/or the magnitude of the force acting upon the monitored mobile component(s). The arrangement can be such that the control unit generates a signal denoting an intent to shift as soon as the magnitude of the monitored force(s) acting upon a mobile component of the transmission matches or exceeds or comes sufficiently close to the magnitude of the retaining force.

In accordance with one feature of the improved method, the signals furnished by the sensors (such as 9 and 11) which monitor the mobile components of the transmission can be utilized to operate the actuator 5 (or an equivalent actuator) and/or to adapt a proper threshold for the movement which must be carried out to shift the transmission into a selected gear ratio or to determine a proper retained position of a mobile component in the following way: One establishes a difference between the signals furnished by the sensor 9 at the instants $t_1$ and $t_2$ as well as a difference between the signals furnished by the sensor 11 at such instants $t_1$ and $t_2$. The control unit then establishes a quotient of the two differences, and such quotient is utilized to establish the proper threshold for the aforementioned movement and a proper retained position.

The aforementioned quotient can denote a shifting distance indicating gradient $g_s$, and a signal denoting an intent to shift into a selected gear ratio can be generated when the value of the gradient $g_s$ is changed to reach a characteristic value or is changed by a characteristic value.

It is possible to ascertain or determine the gradient $g_s$ by resorting to the equation $$g_s = |s_{s(i)} - s_{s(i-1)}| / |s_{G(i)} - s_{G(i-1)}|$$

wherein $s_{s(i)}$ is a signal denoting a parameter of the lever 10 at the instant i, and $s_{G(i)}$ is a signal denoting a parameter of the internal component 12 and/or 13b at the instant i.

It is also possible to arrive at the gradient $g_s$ by resorting to the above equation for $g_s$ but with the following differences: The signals $s_{s(i)}$ from the sensor 9 and the signals $s_{G(i)}$ from the sensor 11 at the instant i are transformed by resorting to a transformation with $f(\alpha,\beta)$ to a common zero point position and to equal amplitude in accordance with the equation $$g_s = \alpha[|s_{s(i)} - s_{s(i-1)}| + \beta]/|s_{G(i)} - s_{G(i-1)}|.$$

Still further, it is possible to ascertain the gradient $g_s$ on the basis of the equation $$g_s = \alpha_1[|s_{s(i)} - s_{s(i-1)}| + \beta_1]/\alpha_2[|s_{G(i)} - s_{G(i-1)}| + \beta_2]$$

wherein the summands $\beta_1$, $\beta_2$ and/or the factors $\alpha_1$, $\alpha_2$ are determined or selected in such a way that the gradient $g_s$ assumes a fixed value when the movements of the external member(s), such as 10 and/or 13a, are synchronized with those of the internal member(s), such as 12 and/or 13b.

For example, when the movements of the lever 10 are synchronized with those of the shaft 12, the gradient $g_s$ can assume the value one of another constant value.

It is often of advantage to select the value of the gradient $g_s$ in such a way that, when the movements of the lever 10 are at least substantially synchronous with those of the shaft 12, the gradient equals one; the value of the gradient exceeds one if the movements of the lever are faster than those of the shaft, and the value of the gradient is less than one if the speed of movement of the shaft exceeds the speed of movement of the lever.

It is further of advantage if the value of the threshold of the movement which is necessary to shift the transmission into a selected gear ratio or the position of rest of a mobile component of the transmission is selected or adapted in such a way that it is indicative of a transition of the gradient $g_s$ from a value greater than to a value less than one.

The adaption of the aforediscussed threshold or position of rest can be selected independently for each ratio of the transmission or for each forward gear ratio and the reverse gear ratio. However, it is equally possible to select the adaption of the threshold and/or of the position so that it is the same for all gear ratios or for all positions of the internal component(s) of the transmission. The adaption can be carried out under certain circumstances or conditions of operation, for example, during shifting from the neutral gear ratio into another gear ratio or from a gear ratio other than the neutral gear ratio into the neutral gear ratio. Still further, it is possible to carry out the adaption during shifting into the first forward gear ratio or into the reverse gear ratio, while the combustion engine in the power train is being started or while the motor vehicle is in actual use.

Referring again to the aforediscussed equation $$F_{Auskuppel} = A * F_{Rast} + B,$$

the parameters A and B denote summands or factors for the scaling or norming of the threshold $F_{Auskuppe}$ as a function of the retaining force $F_{Rest}$.

The parameters C, $C_o$ and D in the aforediscussed equation $\Delta s_{Auskuppel} = C*(C_o \cdot F_{Rast} + D_o + D)$ are summands or factors for the scaling of the threshold $\Delta s_{Auskuppel}$ as a function of the retaining force $F_{Rast}$. The parameter $C_o$ corresponds to the existing or prevailing physical stiffness between the lever 10 and other parts of the transmission, $D_o$ denotes the play or clearance, and the summands C and D can be utilized for further scaling in order to achieve a variation or departure of the disengagement threshold from the retaining force.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of actuating torque transmitting systems in the power trains of motor vehicles and, therefore, such adaptations should and are intended to be comprehended within the meaning and range of equivalence of the appended claims.

What is claimed is:

1. A method of regulating the operation of an apparatus for regulating an engageable and disengageable system for transmitting torque in a power train wherein a transmission has a plurality of gear ratios, at least one mobile external gear ratio selecting member, at least one mobile internal gear shifting member, and a connection between the external and internal members, wherein first and second sensors are provided to respectively transmit first and second signals denoting the positions of the external and internal members of the transmission, and wherein a control unit comprises means for receiving the first and second signals, comprising the steps of evaluating the first and second signals in the control unit; generating in the control unit third signals on the basis of the difference between the first and second signals; and disengaging the torque transmitting system by way of an adjusting device when the evaluation of said first and second signals results in the generation of a third signal denoting an intent to shift the transmission into a selected gear ratio.

2. The method of claim 1, further comprising the step of connecting the control unit with at least one electronic circuit for a constituent of the power train.

3. The method of claim 1, wherein the signals from at least one of the sensors are indicative of a threshold value of a position of the at least one external member at which said second signal denotes an intent on the part of an operator to shift the transmission into a selected gear ratio.

4. The method of claim 1, wherein the signals from at least one of the sensors are indicative of a threshold value of a distance covered by said at least one external member when said second signal denotes an intent on the part of an operator to shift the transmission into a selected gear ratio.

5. The method of claim 1, wherein said evaluating step includes an adaption of signals denoting one of (a) a threshold of movements of said at least one external member and (b) a position of dwell of said at least one external member in a selected gear ratio of the transmission independently for each of said gear ratios.

6. The method of claim 5, wherein said adaption of signals comprises the steps of ascertaining actual clutch disengagement threshold values, memorizing a set of clutch disengagement values in the control unit, and calculating adapted signals on the basis of said actual values and said memorized values by means of a recursive parameter estimator.

7. The method of claim 1, wherein said evaluating step includes identical adaption of signals denoting one of (a) a threshold of movements of said at least one external member and (b) a position of dwell of said at least one external member in a selected gear ratio for each of said gear ratios.

8. The method of claim 1, wherein said evaluating step includes an adaption of signals denoting one of (a) a threshold of movements of said at least one external member and (b) a position of dwell of said at least one external member in a selected gear ratio of the transmission during at least one predetermined stage of operation of the transmission.

9. The method of claim 8, wherein said at least one stage involves a shifting of the transmission from a neutral gear ratio to another gear ratio.

10. The method of claim 8, wherein said gear ratios include a neutral gear ratio and a plurality of additional gear ratios, said at least one stage involving a shifting of the transmission from one of said plurality of additional gear ratios into said neutral gear ratio.

11. The method of claim 8, wherein said gear ratios include a first forward gear ratio and a reverse gear ratio, said at least one stage involving shifting the transmission into one of said first and reverse gear ratios.

12. The method of claim 8, wherein said at least one stage includes starting the apparatus.

13. The method of claim 8, wherein said at least one stage involves starting an engine of a motor vehicle embodying the power train.

* * * * *